United States Patent [19]

Goto et al.

[11] Patent Number: 5,019,846
[45] Date of Patent: May 28, 1991

[54] DATA RECORDING DEVICE FOR CAMERA

[75] Inventors: Tetsuro Goto, Funabashi; Kosho Miura, Yokohama, both of Japan

[73] Assignee: Nikon Corporation, Tokyo, Japan

[21] Appl. No.: 556,455

[22] Filed: Jul. 24, 1990

Related U.S. Application Data

[62] Division of Ser. No. 403,295, Sep. 5, 1989, Pat. No. 4,958,174.

[30] Foreign Application Priority Data

Sep. 6, 1988 [JP] Japan .................................. 63-117073
Sep. 6, 1988 [JP] Japan .................................. 36-117074
Sep. 6, 1988 [JP] Japan .................................. 63-223255

[51] Int. Cl.⁵ .............................................. G03B 17/36
[52] U.S. Cl. ...................................................... 354/217
[58] Field of Search ........................................ 354/217

[56] References Cited

U.S. PATENT DOCUMENTS 4,728,976 3/1988 Takahashi et al. ............. 354/217 X

Primary Examiner—Michael L. Gellner
Attorney, Agent, or Firm—Shapiro and Shapiro

[57] ABSTRACT

A camera data recording device comprising a control mode selector, a data mode selector and a recorder. The control mode selector sets at least one of plural control modes concerning with plural camera functions. The data mode selector selects one mode from plural data recording modes each enabling a selective recording of plural fundamental data when control mode is not set by the control mode selector, and selects one mode from plural setting modes concerning with the setting data associated with said control mode and one mode from data recording modes when one of plural control modes is set by the control mode selector. The recorder records the data on a film in response to the data recording mode or the setting mode.

2 Claims, 18 Drawing Sheets

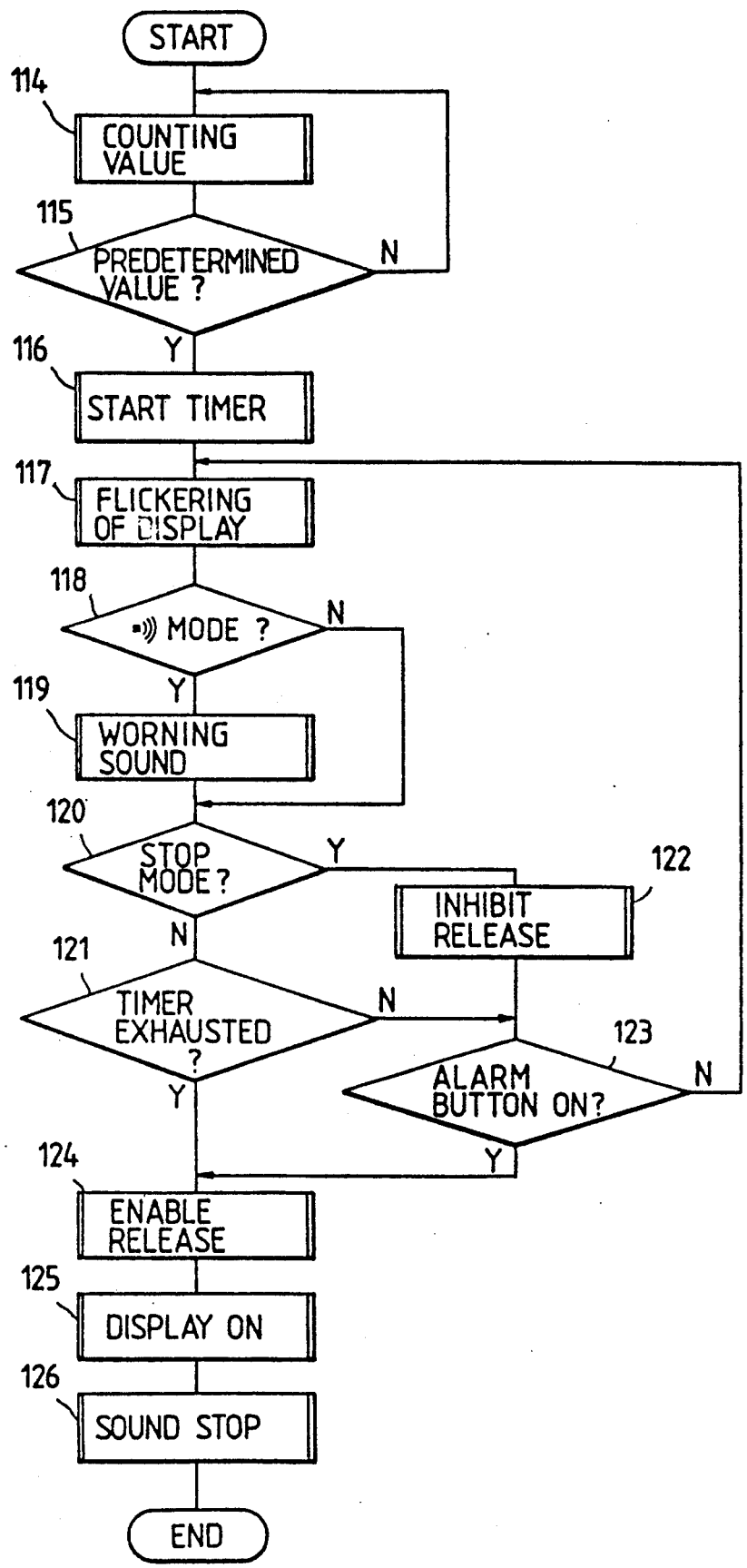

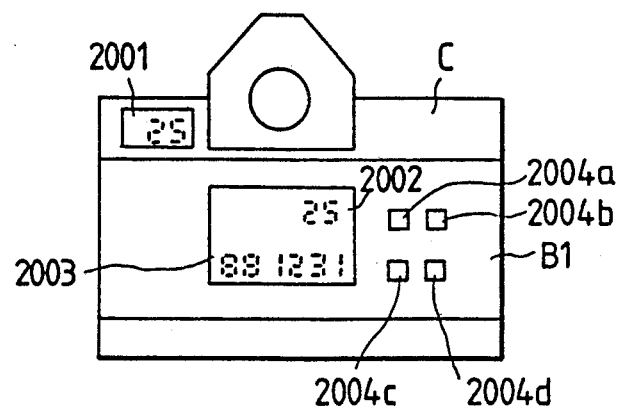
FIG. 24
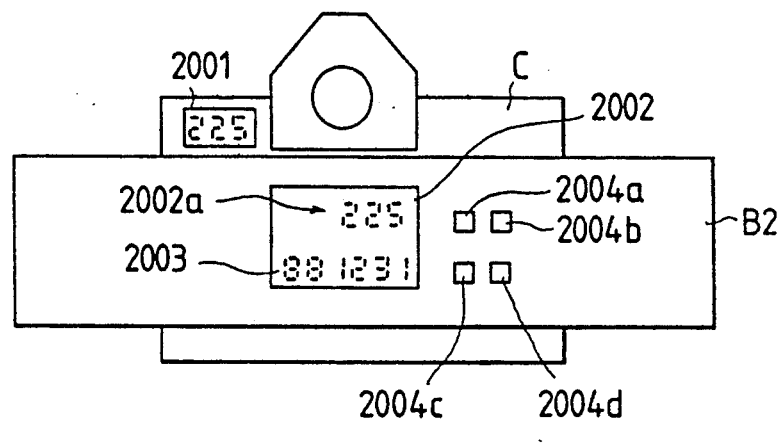
FIG. 25
FIG. 26
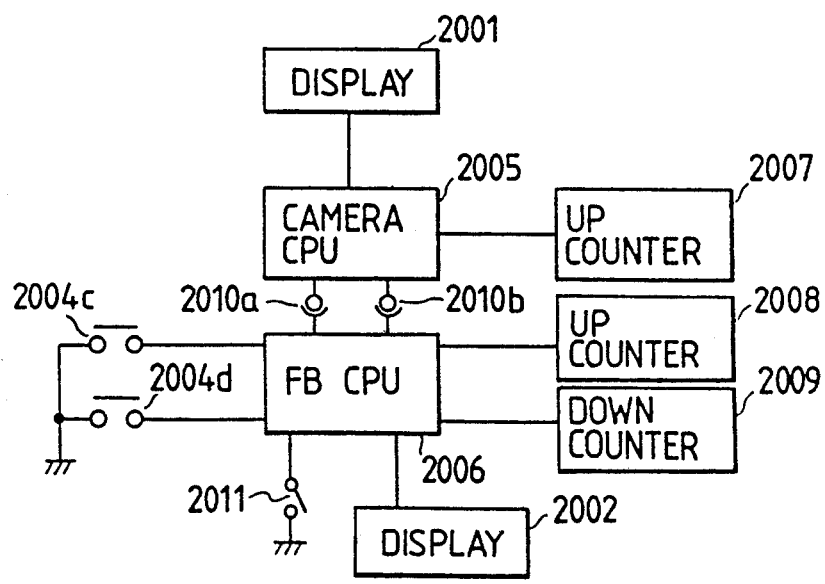

DATA RECORDING DEVICE FOR CAMERA

This is a division of application Ser. No. 403,295, filed Sept. 5, 1989, now U.S. Pat. No. 4,958,174.

BACKGROUND OF THE INVENTION

1. Field of the Invention

The present invention relates to a data recording device for a camera and a camera with a film counter which is capable of mount a long film back.

2. Related Background Art

The data recording device (to be referred to as "a data back" hereinafter in this specification) can select a plurality of data recording modes. For instance, in order to select one of the fundamental data "year-month-day", "day-hour-minute" and "hour-minute-second", upon depression of the operating botton, the selected fundamental modes is displayed by a LCD for the exterior displaying and upon operating a shutter, the data data displayed is recorded on the surface of the film. In addition to the data recording function described above, the data back has various functions. That is, the data back has various control modes corresponding the above-described function and a user may freely select a desired control mode. In order to accomplish a special function, it is needed to record the special function or a control mode corresponding thereto. Among such functions, the so-called bracketing exposure control to perform blacketing photography is well known in the art.

According to the conventional techniques described above, the data recording function, the control function such as bracketing and a function of recording a selected fundamental data are only incorporated with a camera body and operating members and the conventional cameras have no highly advanced function for selecting the data concerning the control function such as bracketing and recording it on the surface of the film.

There have been proposed various types of cameras capable of recording on the surface of a film in terms of numerals the data of an exposure.

In general, the data recording device is incorporated with the camera back and has a recording means consisting of a plurality of light-emitting diodes (LED) arranged to be turned on to indicate numerals and a display means such as a liquid crystal display (LCD) for displaying the numerals to be recorded. In the case of recording, LEDs are turned on in synchronism with the exposure operation so as to record the selected data on the film and the contents of the data can be confirmed prior to the exposure. However, in the case of such conventional data recording device, the data to be recorded on the film must coincide with the data displayed by the displaying means so that the number of digits of the data to be recorded on the film is coincident with the number of digits of the numeral displayed by the display means.

Recently the demand for increasing the functions carried out by the data recording device is increasing. That is, in addition to a calendar data represented by a year, a month and a day, it is demanded to record on the film and display various data such as the number of exposed frames of a film, an exposure coefficient and the like. Furthermore, a function such as an interval mode or the like different from the fundamental recording function is desired to be incorporated in the camera. In order to satisfy the above-described demands, it is needed not only to increase the number of digits of the recording means, but also to enlarge a liquid crystal display so that various data may be displayed. However, the recording device incorporating the above-described functions becomes large in size and only a limited space is available in the camera back, it is difficult to recording device in the camera back. Even when the recording device is incorporated in the camera back, it is impossible to satisfy all the functions demanded described above.

There have been devised and demonstrated various types of cameras in each of which a film counter for counting the number of exposed frames is incorporated so that every time when one exposure is made, the value of the film counter is incremented by one and is displayed.

However, the length of the film loaded in the camera is limited. Therefore, when it is desired to expose a large number of frames, employed is a method in which a long-film back is loaded on the camera body and a long film cut out from a film roll is set into the long-film back film so that hundreds of frames can be continuously exposed.

In the case of the camera loaded with the long film back as described above, the number to be counted by the film counter incorporated in the camera body is limited and so far only a two digit number is displayed. In the case of the display a number of exposure counted by the film counter when a long-film back is mounted on a camera, when the display of the number of exposures of the frames of a long-film back is made by the camera body, the display of the frames of the film counted by, for instance, a mechanical film counter is interrupted at the highest number which the mechanical counter can count. As a result, the display of the number of the exposed frames of the long-film back is in excess of the limited value of the camera body, they do not coincide with each other so that there is a fear that a user erronesouly recognizes the number of exposures made during photographing. Furthermore, in the case of a long-film back incorporated with a down counter means displaying the number of frames to be exposed, when the down or decrement counting mode is selected, the display by the camera body does not coincide with the display by the long-film back so that there still remains a fear that the user erroneously recognizes the number of frames to be exposed.

SUMMARY OF THE INVENTION

In view of the above, the primary object of the present invention is to provide a camera data recording device which will not display the unnecessary data associated with the control mode when the latter is not selected.

To the above and other ends, according to the present invention, the camera data recording device is provided with a plurality of data recording modes one of which is selected at a time and a control mode such as a bracketing exposure control which can be by another operation. Only when the control mode is selected, in addition to a plurality of data, the data associated to the data recording in the control mode are selectively recorded in the data recording mode. Therefore when the control mode such as the bracketing exposure control is not selected, the data associated with the setting of the control mode are included in a plurality of fundamental data and are recorded selectively in the recording mode. Therefore, when the control mode is not selected. The data associated with the setting of the control mode cannot be inserted into a plurality of data. Only when the control mode is selected, the data associated with the setting of the control mode are inserted into a plurality of fundamental data and are recorded on the film.

A second object of the present invention is to provide a camera data recording device in which, when the data to be recorded and externally displayed are small, the external display is executed in a small space, but when the data to be displayed are many, the display region is changed as needs demand and the data are displayed.

To the above and other ends, according to the present invention, in a camera data recording device of the type including a data recording means for recording at least the setting data in the frame of the film and an external display means for display means for displaying the setting data, the camera recording device further comprises a recording data setting means for dividing the screen of the external display means into a plurality of sections into each of which the individual data is set, and a control means which reduces in size the displayed data or inhibits the display of the setting data in one or more divided sections and displaying the setting data in a predetermined number of sections extended to the other sections.

Some examples of the control modes are the auto-bracketing exposure control mode, the interval exposure mode, the delay mode, the mode for exposing for a long exposure time, the daily alarm mode, the focusing priority mode, the film alarm mode and the film stop mode, which will be become more apparent in the preferred embodiments to be described in conjunction with the accompanying drawings With the camera data recording device with the above described construction, when the digits of the data to be recorded and displayed are within a predetermined number of digits of the external display means, the data itself is displayed by the external display means, but when the digits of the data to be externally displayed are many, the setting data sections, the display in other sections is reduced in size or inhibited so that the setting data can be displayed in the sections extended to the adjacent sections, whereby all of the setting data required can be displayed.

Therefore, without increasing in size a liquid crystal display (LCD) which is an external display means, the function of a camera data recording device which is incorporated in the camera back can be increased.

A third object of the present invention is to provide a camera incorporating therein a film counter which can make a film count display on the side of the camera body coincident with a film count display by a long-length film back if the latter is mounted on the camera body.

To the above and other ends, according to the present invention, in a camera of the type comprising a film counter incorporated in the camera body, a film counter incorporated in the camera body for counting the number of frames exposed and an electro-optical display means for displaying the count data on the side of the camera body and capable of mounting a long-length film back incorporating therein a film counter for counting the number of frames exposed on the camera body, a camera data recording device further comprises a detection means for detecting whether or not the long-length film back is mounted; a reception means for receiving the film count information or data from the long-length film back and a display control means which causes said display means to display the film count information or data on the side of the long-length film back when the output representative the mounting of the long-length film back on the camera body is received and when the output representative of the mounting of the long-length film back is not obtained, the film count information or data on the side of the camera body is caused to display by said display means. Furthermore the long-length film back incorporates therein an up counter for counting the number of frames exposed and a down counter for counting the number of frames to be exposed.

With the camera with the film counter in accordance with the present invention, when the long-length film back mounting is detected, the film count information or data is read out by the camera body and is displayed by the display means incorporated in the camera body. As a result the film count display on the side of the camera body coincides with the film count display on the side of the long-length film back so that the user can correctly confirm the number of frames exposed or to be exposed when an exposure is made.

BRIEF DESCRIPTION OF THE DRAWINGS:

FIGS. 11A–11F illustrate another flowchart thereof;

FIGS. 19–23 are views used to explain a second preferred embodiment of the present invention;

FIG. 19 shows a rear view of the second embodiment;

FIG. 22 is a block diagram illustrating a data back circuit;

FIG. 23 shows a flowchart illustrating the mode of operation of said circuit;

FIGS. 24–28 illustrate a third preferred embodiment of the present invention;

FIG. 24 illustrates a camera to which is applied the present invention;

FIG. 25 is a rear view illustrating a long film back mounted on the camera shown in FIG. 24;

FIG. 26 is a block diagram of a circuit interconnecting the camera main body and the long film back;

FIG. 27 is a flowchart illustrating the mode of operation of the camera body; and FIG. 28 is a flowchart illustrating the mode of operation of the long film back.

DETAILED DESCRIPTION OF THE PREFERRED EMBODIMENTS

First Embodiment, FIGS. 1-19

Figure 1:
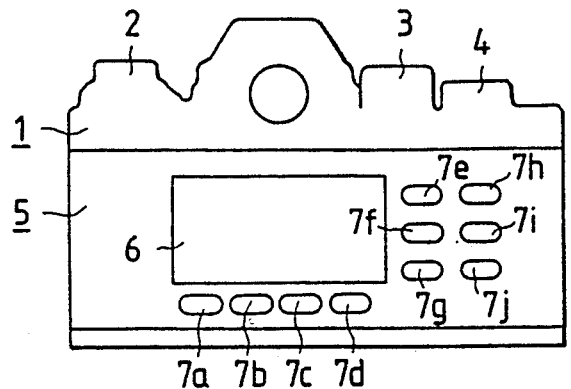
FIG. 1 is a rear view illustrating a camera and a data back in accordance with the present invention.

FIG. 1 shows a rear view of a camera 1 equipped with a data back 5.

As shown in FIG. 1, a rewinding means 2, a shutter dial 3 and release means 4 are arranged over the top of the camera so that a user rewinds an exposed film, sets a shutter time and release the shutter.

The data back 5 provided the camera 1 is used to record the data selected by the user over a portion of a frame of a film through a recording means (not shown). The data selection mehtod is such that the user depresses the operation buttons 7a-7j while confirming the contents displayed by a display LCD 6. The data displayed by the LCD 6 coincides with the data to be recorded on the film except in case of some databack functions or camera function.

The functions of the operation buttons 7a-7j are as follows. The print button 7a selects whether a data set is to be recorded on the surface of the film; the start button 7b is to permit or inhibit the functions such as an interval mode (referred as "INF" hereinafter in this specification), an exposure delay mode (referred as "DELAY MODE") and so on; the bracketing button 7c selects whether the bracketing mode (referred as "BKC MODE") can be selected; the alarm botton 7d is used to interrupt the alarm signal caused by databack function such as a daily alarm, a film alarm, a film stop and so on and to prevent the generation of the alarm sounds as the alarm signal. The function button 7e selects a function prior to the setting of the conditions; the select button 7f selects the number of digits to be varied when the set condition of each databack function is varied; the set-reset button 7g selects the databack function prior to functioning of the INT and DELAY MODES and so on; the button 7h selects and display the data of conditions set in each databack function; the up button 7i and the down button 7j are used to freely increase or decrease values in the set conditions.

The function of the operation buttons 7a-7j will be described in detail hereinafter in conjunction with the explanation of each databack function.

The data back 5 includes a battery storage in which are stored one or more dry cells which are a power supply, an electronic module and a data recording unit which is connected to the electronic module and consists of an array of LED pixels and connecting pins for exchanging the signals between the camera 1 and the data back 5. (All of them are not shown.)

Figure 2:
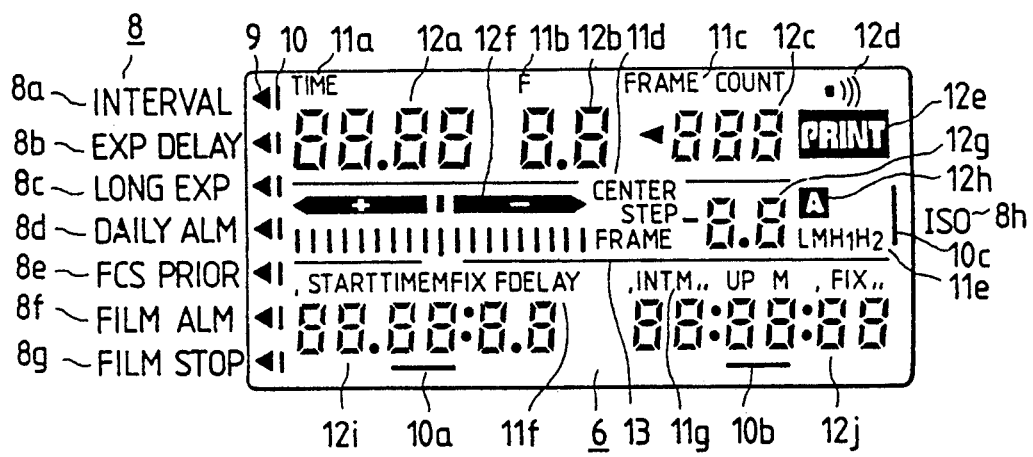
FIG. 2 is a total segment view of a LCD thereof.

FIG. 2 shows a display segment pattern of LCD 6 and its peripheral parts. FIG. 2 shows all the segments for the sake of explanation, but in practice, the segments selected from the segment array are selected for display.

At the peripheral portions beyond the left side edge and the right side edge of LCD 6 are printed eight function modes. At the peripheral portion beyond the left side edge of the LCD 6 are marked with seven functions; that is, "INTERVAL" 8a, "DELAY MODE" or "EXP DELAY" 8b, "LONG EXP" 8c indicating a long time exposure mode, "DELAY ALM" 8c which is an abbregation of the delay alarm mode, "FCS PRIOR" 8d representing the focusing priority mode, "FILM ALM" 8f indicating the film alarm mode and "FILM STOP" 8g in such a way that they can be visually recognized and confirmed.

At the periphery beyond the right side edge of LCD 6 is printed "ISO" 8h in the manner described above.

Along the left side edge portion of LCD 6 are printed seven setting marks (9a-9g) in the form of a triangle in opposing relationship the above-described marks "INTERVAL" 8—"FILM STOP" 8g, respectively. Indicating marks 10 in the form of an "ellipsis" are printed inwardly of the seven setting marks 9a-9h in opposing relationship with the setting marks (9a-9g), respectively.

At the upper left portion of the LCD 6 are arranged a four-digit numeral (including a decimal point) display 12a a two-digit numeral display 12b in order to display a shutter time and an aperture stop, respectively. In order to distinguish them from each other, displays "TIME" 11a and "F" 11 are simultaneously turned on.

A horizontally elongated triangle and a three digit numeral display 12c are arranged on the left side of the "F" display 11 so as to indicate the number of frames of a film. In order to distinguish the three-digit numeral display 12c, a "FILM COUNTER" 11c is turned on concurrently.

Arranged at the upper right portion of LCD 6 are an alarm mark 12d indicating the selection of the alarm sound generation mode and a print mark 12e for indicating the recording the data.

A display unit (to be referred as "the BKT unit" hereinafter in this specification for displaying each condition in the BKT MODE is arranged at the left center portion and the exposure operation is displayed by a bar graph 12f. On the left side of the BKT unit, the setting conditions in the BKT modes of a center value, a stepped value and the number of exposed frames are represented by marks "CENTER", "STEP" and "FRAME" 11d. The value of one of them is displayed by a two-digit numeral including a decimal point display unit 12g.

A film speed display unit is arranged at the right center portion. A mark 12h represents an automatic setting mode and a combination of marks "L", "M", "H1" and "H2" 114 represents a rank discrimination.

On the right side of the marks 11e, an indication mark 10c in the form of an elongated ellipse is displayed.

A film speed display unit is arranged at the right center portion. A display is made by a combination of a mark 12h indicating an automatic setting and rank discrimination marks "L", "M", "H1" and "H2" 11e. On the right side of the mark 11e, an indicating mark 10c is displayed.

A setting condition for the data recording mode, INT mode and so on is displayed by a combination of a six-digit numeral including a decimal point, colon and astrophie display unit 12i and discrimination marks "START", "TIME", "FIX", and "DELAY" 11f. An indicating mark 10a in the form of a ellipse is displayed under the set condition display unit. On the right side of the set condition display unit, a set condition representing the data recording mode, INT mode and so on (to be referred as "the right recording unit" hereinafter in this specification) is displayed by a display unit displaying a six-digit numeral including a decimal point, a colon and astrophie 12*i* and discrimination marks "START", "TIME", "M", "FIX", "F" and "DELAY" 11*f*. An indicating mark 10*b* is arranged below the right recording unit.

In addition to the above-described display units, in order to facilitate the visual configuration, a plurality of line segmetns are marked.

Figure 3:
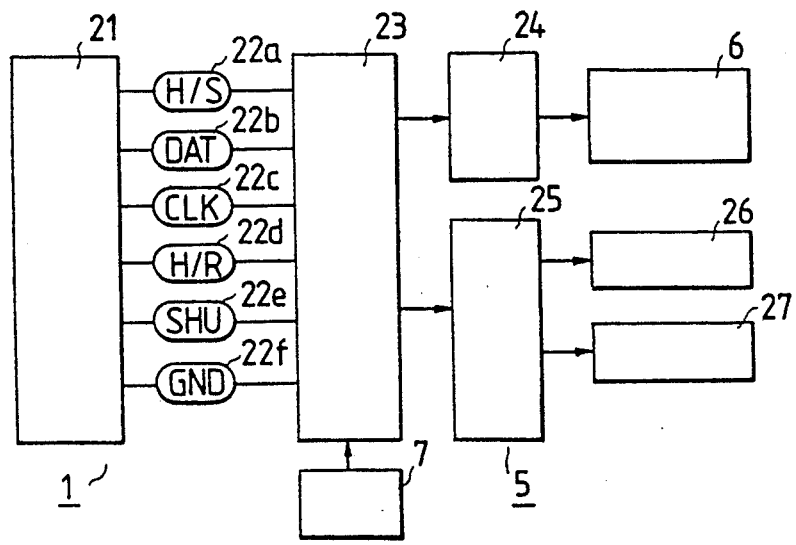
FIG. 3 is a block diagram illustrating an electric circuit thereof.

FIG. 3 is a block diagram illustrating the electric circuits of the camera 1 and the data back 5 shown in FIG. 1.

The camera 1 incorporates a CPU 21 which exchanges various data with the data back 5 through interface circuits (not shown) and contacts 22*a*-22*f*.

The data back 5 includes a data back CPU 23, a LCD driver 24, a LED driver 25, a LCD 6, a LED 26 outside of a frame, a LED inside a frame and operating button 7 and exchnages the data through interface circuits (not shown) and contacts 22*a*-22*f* with the camera 1.

In response to the state of a switch for detecting whether the camera back is opened or closed, a switch group 7 and the data received, the data back CPU 24 controls the LCD driver so that the data is displayed on the screen of LCD 6. Simultaneous with the input signal to be described below, the data back CPU 27 controls the LED driver to turn on LEDs 26 and 27 both outside and inside of the frame so that the data is recorded on the surface of the film.

Next the functions of the contacts 22*a*-22*f* will be described. They are called a handshake signal terminal "HS", a clock signal terminal "CLK", a data signal terminal "DAT", a half-step release signal terminal "H/R", a shutter signal terminal "SHU" and a grounding terminal "GND". The H/S terminal 22*a* is provided in order to confirm the existence of both CPUs 21 and 23 before the data exchange is carried out between them. The DAT terminal is provided in order to transmit or receive serially the data in synchronism with sync clocks to be described in detail below. The CLK terminal 22*c* is provided in order to transmit the sync clock signals. The H/R terminal 24*d* is provided in order to start the power supply incorporated in the camera (The signal for starting the power supply is called a half-step depression signal which is equivalent to the signal generated when the release operating unit is depressed a half step) and for releasing the shutter. The SHU terminal 22*e* transmits the trigger signal for actuating the data recording function of the data back 5 when the shutter of the camera 1 is released.

Figure 4:
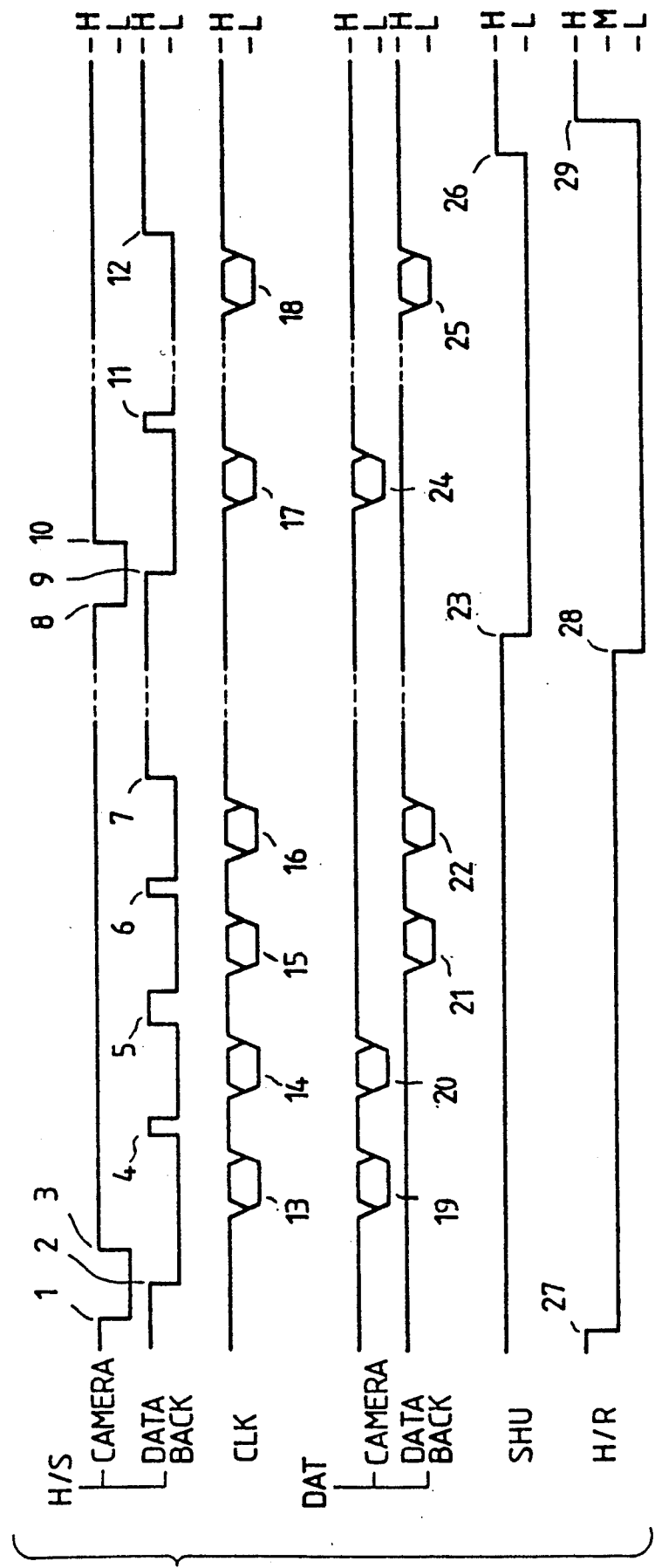
FIG. 4 shows a timing chart used to explain the mode of the operation thereof.

FIG. 4 illustrates the data exchange between the camera 1 and the data back 5. Of the terminals 22*a*-22*f*, bipolar signals are inputted to and outputted from the H/S terminals 22*a* and the DAT terminal 22*b* so that, as shown in FIG. 4, the signal sources are separated from the camera 1 and the data back 5 for the sake of easy standing.

The signal exchange between the main CPU 21 and the data back CPU 23 is generally carried out in a manner to be described below.

First the camera 1 causes the H/S terminal 22*a* to go LOW (the point (1) in FIG. 4). Upon detection that the H/S terminal 22*a* is LOW, the data back itself causes the H/S terminal 22*a* to go LOW (the point (2). After predetermined time interval from the camera 1 causes the H/S terminal 22*a* to go from LOW to HIGH (the point (3)) and detects the level of the H/S terminal 22*a*. Since the H/S terminal 22*a* is maintained at LOW, it is confirmed that the data back is ready to exchange the data.

Thereafter, the sequence for transmitting the data from the camera 1 to the data back 5 is started. The camera 1 outputs the clock signal (13) through the CLK terminal 22*c* simultaneous with the transmission of the first byte data signal (19) to the DAT terminal 22*b* from the camera 1.

Upon reception of the first data signal (19) the data back 5 causes the H/S terminal 22*a* to go HIGH temporarily and upon completion of the storage of the data by the internal processing of the received signal, the data back causes the H/S terminal 22*a* to go LOW (the point (4)) and demands the camera 1 for the transmission of the next data.

In response this demand, the camera 1 transmits the clock signal (14) to the DAT terminal 22*b* and transmits also the second byte data signal (2) to the DAT terminal 22*b*.

In response to the reception and the storage of the data, the data back 5 causes the H/S terminal 22*a* to go HIGH and then to go LOW (the point (5)).

Next the sequence of transmitting the data from the data back 5 to the camera 1 is started.

As described above, the clock signals (15) and (16) are transmitted through the CLK terminal 22*c* to the data back 5. The two byte data signals are transmitted through the DAT terminal 22*b* at the signals (21) and (22). After the transmission of these data signals, the H/S terminal goes HIGH and in response to the completion of the preparation for the transmission of the next data, the H/S terminal is switched to low by the operations (the points (6) and (7)).

As described above, according to the preferred embodiment, two byte signals are outputted from the camera 1 and inputted into the camera while two byte signals are outputted from the data back 5 and inputted into the camera 1.

One cycle data exchange is a normal data exchange accomplished periodically while the power supplies of the camera 1 and the data back 5 are turned on.

To turn on the power supplies of the camera 1 and the data back 5, in addition to turning on a power supply switch which is turned on when the release operation member 4 of the camera is depressed a half step and which is referred to as (the half-depression switch), the data back 5 causes the H/R terminal 22*d* to go LOW (the point (28)).

When the shutter release operation of the camera 1 is started, the shutter signal is outputted through the SHU terminal 22*e* (the point 23).

The timing of the generation of the shutter signal (the point (23)) varies from one data back to another so that in general the SHU terminal 22*e* is connected to the interruption terminal of the data back CPU 23 shown in FIG. 3. Upon detection of the shutter signal, the data back CPU 23, the routine which has been accomplished so far is interrupted so that the preparation for the next data exchange is carried out.

When the camera 1 outputs the shutter signal (the point 23) and then starts the operating for causing the H/S terminal 22*a* to go LOW (the point 8) and further carries out the data exchange during the shutter release. The data exchange during the shutter release is substantially similar to the above-described the general data exchange. In this specification, the points (8), (9), (10), (11), (12), (17), (18), (24) and (25) correspond to the points (1), (2), (3), (4), (7), (13), (16), (19) and (22), respectively, in the general data exchange.

However it must be noted here that the difference that the general data exchange is periodically carried out, but the data exchange during the shutter release is accomplished only one time exists.

After one data exchange during the shutter release, the data back accomplishes the recording of the data, which is the main role of the data back 5. The control of the data recording is carried out by the data back 5 itself so that when a low speed film is used, it sometimes happens that the data recording is not finished prior to the return of the shutter signal (the point 26).

In the case of controlling the shutter release operation of the camera 1 from the data back, the H/R terminal 22d returns HIGH (point 29) after the detection that the SHU terminal 22e has returned HIGH (the point 26).

Figure 5A:
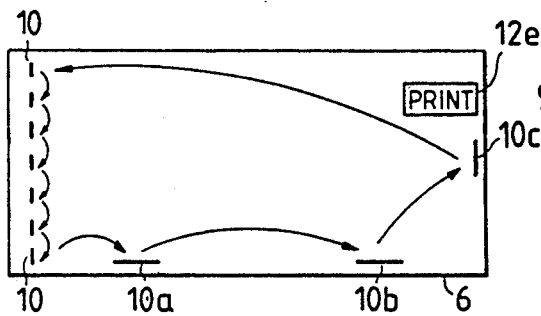
FIGS. 5A–5C are views used to explain a displaying mode thereof.
Figure 5B:
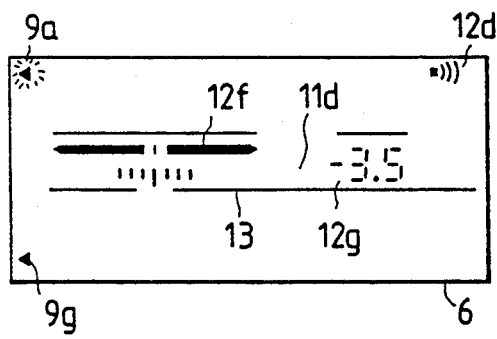
Figure 5C:
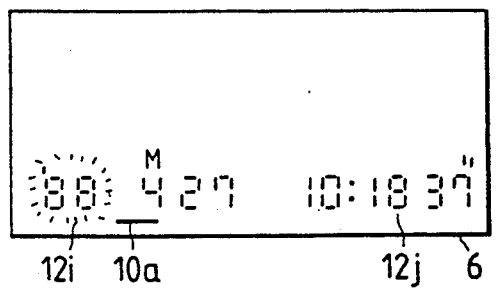

Referring next to FIGS. 5A-5C, the relationship between the functions of the operating button 7a-7j described simply with reference to FIG. 1 and each segment display by LCD 6 will be described in more detail.

First referring to FIG. 5A, when the print button 7a is depressed, the print mark 12e is turned on. When the shutter is released under this condition, a desired data is recorded on the surface of the film. When the print button 7a is depressed again, the print mark 12e is turned off, indicating that no data recording is made.

When the function button 7e is depressed, only one of the elliptical indicating marks 10, 10a, 10b and 10c is displayed in the sequence indicated by the arrow in FIG. 5A. In this case, one of the other setting buttons is depressed as described in more detail hereinafter, it becomes possible to vary the set conditions of the function corresponding to the setting mark turned on.

Next referring to FIG. 5B, when the bracketing button 7c is depressed, the bar graph 12f of the BKT unit indicating the conditions of the BKT modes, the numerical unit 12g and the mark 11d are turned on. When they are turned on, the mark 11d is not turned on. As described in detail hereinafter, the mark 11d is displayed only when the bracketing condition is changed.

The boundary lines 13 is always turned on not only in FIG. 5B but also in other figures so as to facilitate the confirmation of each display region.

The boundary lines 13 may be segment patterns of LCD itself, but the same effect can be attained when they are printed.

Next upon depression of the set-reset button 7g is depressed, when the conditions set are satisfied, the setting marks 9a and 9g can be turned on. They are turned off when the set-reset button is depressed again. However, the indicating mark 10 is turned on only for the corresponding function. It follows therefore that when it is desired to turn one the indicating mark 9g after the setting mark 9a has been turned on, the function button 7e is depressed a plurality of times so as to shift the indicating mark.

When the setting marks 9a and 9g are turned on, the functions indicated by the setting marks 9a and 9g are ready to be carried out. The function of the INT mode for counting a time interval is started when the start-stop button 7b is depressed. In this case, the setting mark is flashed to indicate to the user that the desired function is carried out. The setting mark 9a in FIG. 5 represents such condition.

When it is desired to interrupt the operation such as the INT mode, it suffices to depress the start-stop button 7b again. Then the setting mark is returned to the turned-on state prior to the start of the function.

The alarm mark 12d is displayed upon depression of the alarm button 7d. When the alarm mark 12d is displayed, it is switched to the mode in which a buzzer produce the alarm sound if various alarms such as daily alarm and so on to be described below.

On the other hand, when the alarm button 7d is depressed again so that the alarm mark 12 is turned off, the alarm sound is not generated and the alarm signal becomes only the flashing of the display.

The alarm button 7d has not only the function of determining whether the visual alarm display is accompanied but also the function of turning off the alarm display and the alarm sound when the alarm button 7d is depressed again while the visual alarm display is turned on and the alarm sound is produced. However, when the alarm button 7d is depressed to interrupt the alarm display and the alarm sound, it is impossible to continue the alarm sound along.

Referring next to FIG. 5C, when the select botton 7f is depressed while the indicating mark 10a is shifted to the left data recording unit 12i, a number consisting of two digits on the left side flashes indicating that it becomes possible to change the numerical data. When the select button 7f is further depressed two times, the flashing two digits are shifted to the center and then to the right. When the select button 7f is depressed, the two-digit numeral display disappeares and returns to its initial state.

When the up button 7i and down button 7j are depressed while the left, center or two-digit numeral is displayed, the flashing two-digit numeral is incremented or decremented by a predetermined unit so that the two-digit number can be changed.

When the mode button 7h is depressed, a part of the indicating mark is switched. For instance, when the mode button 7h is depressed under the condition shown in FIG. 5C, the display of "YEAR, MONTH, DAY" shown in FIG. 5C is switched to the display of "DAY, HOUR, MINUTE". When the mode button 7h is depressed again, the display is further changed.

In addition to the above described funciton of switching the data, hour and second, the mode button 7h has change or confirm the detailed control data of each function so that the content of a display may be switched as will be described in more detail hereinafter.

Figure 6A:
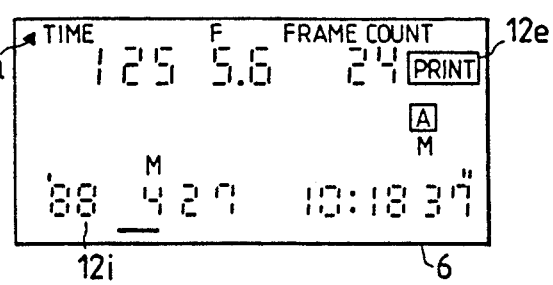
FIGS. 6A–6C are views used to explaining another displaying mode thereof.
Figure 6B:
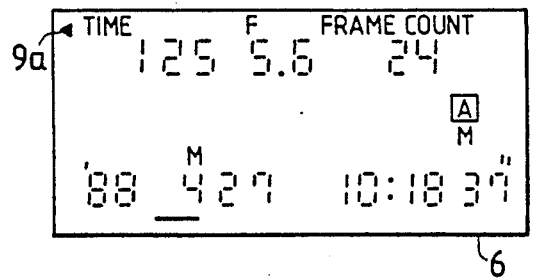
Figure 6C:
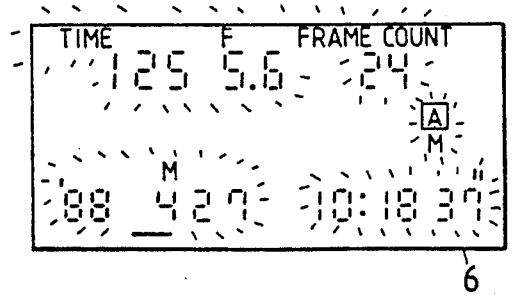

FIGS. 6A-6C are views used to explain the battery check display in accordance with the present invention. In the normal cases; that is, when the battery loaded in the data back 5 has a sufficient capacity, which is called the first state, this state is displayed as shown in FIG. 6A.

In FIG. 6A, the data recording mode is set so that the print mark 21e is flashing. Furthermore the display in the left recording unit 12i is turned on.

The data back CPU 23 described with reference to FIG. 3 carries out the battery check immediately after resetting when a new battery is loaded, at a predetermined time everyday or at the timing of recording the data on the surface of the film. The second battery state is such that it is impossible to record the data but it is possible to control the function in the INT mode or the like. When such second state is detected, the print mark 12e is turned off so that the screen of LCD 6 displays as shown in FIG. 6B.

The above-described mode is the mode in which no data is recorded and even when the camera is used, the consumption of the battery is maintained at a minimum level. Thereafter when the data is desired to be recorded, the print button 7a is depressed, it becomes possible again to record the data as described with reference to FIG. 5A and the display over the screen of LCD 6 is switched to FIG. 6A.

But it is apparent that when the battery check is carried out, there is the possibility of displaying as shown in FIG. 6.

The third battery state is such that the battery is almost consumed so that it becomes impossible to record the data. When the third state is detected, as shown in FIG. 6C, the print mark 12e and the setting mark 9a are turned off and the display segments in the left recording unit 12i which have been turned on flashes, giving the alarm signal to the user. In this case, the alarm signal does not exclude the sound alarm. In the case of the third state, every control function is interrupted. The reason is that there exists no assurance that the function of measuring the time and the function of releasing the shutter in the camera body 1 from the data back are correctly carried out.

Figure 7:
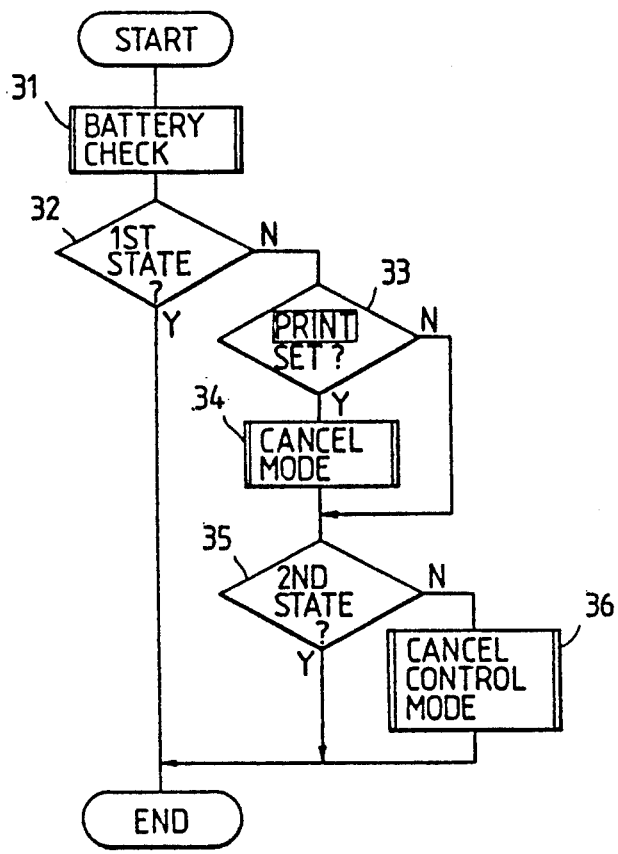
FIG. 7 is a flowchart thereof.

FIG. 7 shows a flowchart of a program for the battery check operation described above.

When the battery check routine is started at a predetermined timing, the capacity of the battery is checked in the step (31). When the result of the battery check is "the first state" in the step (32), the battery check routine is terminated. When the battery is not in "the first state" in the step (32), whether or not, it is detected in the step (33) whether or not the camera 1 and the data back 5 are in the data recording mode. When the data recording mode is detected, it is released to turn off the print mark 12e in the step (34). And then whether the battery is in "the second state" or not is detected and when "the second state" is detected, the routine is terminated.

When the battery is not in "the second state" but is in "the second state" (the step (35), various control funcitons which have been previously set and have been operating are released in the step (36) and the routine is terminated.

The mode or function which must be released ink the step (36) is a mode in which, for instance, the LE mode directly affects the exposure of the camera so that the erroneous operation of the data back 5 results a very dangerous result.

However, no adverse effect occurs even when the time measuring function is continued.

A part of the routine shown in FIG. 7 can be used for other purposes. For instance, while the camera back is opened or the data back 5 is dismounted from the camera 1 while various controls are carried on, it serves to interrupt every control mode which has been previously carried out.

Not only the modes for directly controlling INT, DELAY, LE and so on but also various alarm modes are interrupted.

To this end, it suffices to use the steps (35) and (36) of the above-described routine so that whether or not the camera back is opened in the step (35). When the camera back is detected opened, various control functions are released or interrupted so that the above-described object can be easily attained.

Refering next to FIG. 8, the relationship between the signals when the data back 5 delivers the shutter release command to the camera 1 will be described.

Figure 8A:
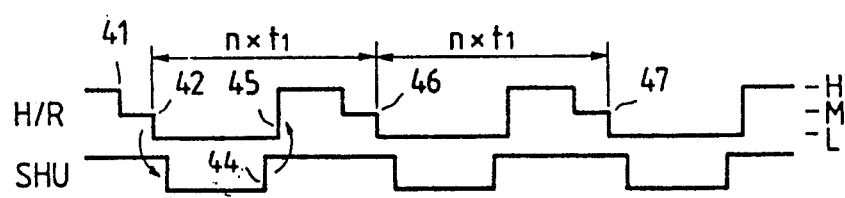
FIGS. 8A–8C illustrate another timing chart thereof.

FIG. 8A is the time chart when every operation is correctly carried out. In the case of the data back CPU 23 being set in the INT mode, when the minimum unit of the time measurement is $t_1$ (which is in general one second), the shutter is released once per $(n \times t_1)$ (where n is a positive integer). The time relationship between the H/R output terminal 22d of the data back of and the SHU output terminal 22e of the camera body 1 is as folllows. The H/R terminal 22d generates an M level signal few seconds prior to a predetermined time when the shutter is released. For instance, in order to release the shutter, the signal level is changed at the point (41) slightly before the signal goes LOW at the point (42). The switching to the M level is a common operation at each shutter release timing as shown in FIG. 8A and under these conditions, the auto-focusing operation or the like is carried out.

When the H/R terminal 22d goes LOW as indicated at the point (42), CPU 21 in the camera body 1 starts the exposure operation and the signal level at the SHU terminal indicated by the point (43) is reversed. When the exposure by the camera body 1 is completed, the signal level at the SHU terminal 22e is returned to the initial level as indicated by the point 45. In response to the switching of the signal level detected, the data back 5 causes the H/R terminal 22d to go HIGH again as indicated at the point (45). Thus a sequence of operations is accomplished.

Thereafter at every predetermined interval time $(n \times t_1)$ the signal at the H/R terminal goes HIGH as indicated by the points (46) and (47).

Next FIG. 8A shows an exmaple that even though the H/R terminal 22d goes LOW, the camera 1 does not respond.

After the H/R terminal 22d goes LOW at the point (48), the data back 5 continuously monitors the variations of the signal at the SHU terminal 22e for a time interval of $N \times t_1$, where N is a positive integer and in general N=8 and $t_1$=1 so that the monitor time interval is eight seconds in most cases.

Figure 8B:
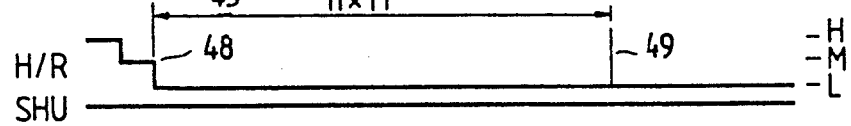

In FIG. 8B, no response is delivered from the camera 1 through the SHU terminal 22e even when the time $(N \times t_1)$ has elasped, the exposure is given up this time and the signal at the H/R terminal 22d is caused to go HIGH. The time interval until this moment is called "the monitor time" in this specification.

However, this moment coincides with the interval timing $(n \times t_1)$ for the next exposure so that the data back 5 causes the H/R terminal 22d to switch to the LOW level again. Then the waveform of the signal at the H/R terminal 22d becomes in the form of a pulse as indicated at the point (49). The pulse-shaped waveform tends to easily disappear by the floating capacity depending upon the assembly and the period of remaining at HIGH is abnormally short so that it becomes impossible to detect the reversal of the signal by the camera body.

Figure 8C:
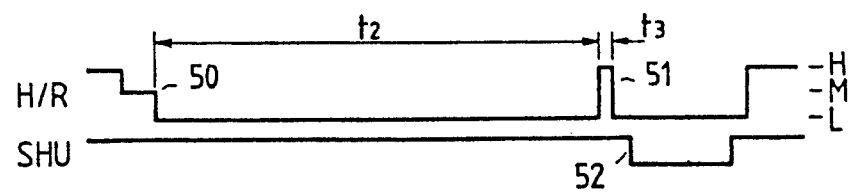

FIG. 8C shows a device which can solve the above-described problem. In this case, "the monitor time" is not $(N \times t_1)$ but is $t_2$ which is not a multiple of the time $t_1$. Then the coincidence of the completion of "the monitor time" with the interval timing can be completely eliminated so that during a time interval between the monitor completion and the next release timing, a time $t_3$ can be obtained. The fact that the level is switched to a LOW level at the point 51 is correctly detected by the camera body 1 so that the shutter release operation is carried out and the response is made at the SHU terminal 22e as indicated by the point (52).

For instance, assume that $t_2$ be set 7.8 sec. Then the time interval $t_3$ becomes 0.2 sec which is generally sufficient to maintain the signal at a HIGH level.

Referring next to FIGS. 9A-9F, the BKT mode will be described in detail hereinafter. In the BKT mode in accordance with the present invention, for each exposure, the variation of exposure; that is the step value; the number of exposures in one bracketing exposure series can be arbitrarily selected; and furthermore, of all the frames exposed by the BKT mode, the center exposure value is freely selected at a value calculated by the camera (an exposure value considered to be reasonable). The setting methods will be described in detail below.

Figure 9A:
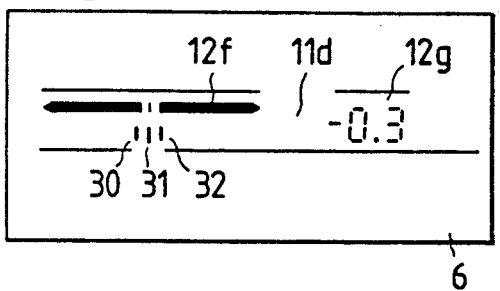
FIGS. 9A–9G illustrate another flowchart thereof.

FIG. 9A illustrates an example of a display displayed on the screen of LCD 6 when BKT button 7c is depressed so as to select the BKT mode.

In this case, the so-called default condition; that is, the center value (representative of the displacement from the value calculated by the camera) is 0; the step value is 0.3 steps; and the number of frame selected is three.

Three vertical rod-like segments 30-32 in the bar graph 12f indicates that three frames are to be exposed. The two-digit numeral unit 12g represents that the first frame is exposed at an exposure value added with an correction value −0.3. The center rod-shaped segment 31 is located at the center of the bar graph 12f and its length us slightly longer that those adjacent rod-shaped segments.

The reason is to distinctly indicate that the exposure condition is the value calculated by the camera itself so that the frame of the camera is exposed without being given any correction. Depending upon the step value and the center value, in some cases, the frames to be exposed are not selected. In such cases, the rod-like vertical segment 31 is not turned on or displayed.

Next the method for setting the conditions of the BKT mode will be described. When the select button 7f is used only for setting the conditions of BKI when the BKT mode is selected. When it is desired to change the conditions displayed in FIG. 9, upon depression of the select button 7f the display is switched to the display shown in FIG. 9B. That is, the bar graph 12 is turned off, but mark 11d indicates "CENTER" and the two-digit numeral display unit 12b indicates 0.0. These conditions indicate that the center value is 0 step (that is, the value claculated by the camera). Thereafter the up or down button 7i or 7j is depressed so that a desired value may be displayed. Next when the select button 7f is depressed again, the display is switched to that shown in FIG. 9C. The mark 11d indicates "STEP" while the two-digit numeral display unit 12g repersents 0.3. This means that every time when each exposure is made, the correction value is changed by 0.3 steps. In order to change the step value, it suffices to depress the up button 7i or the down button 7j.

Figure 9D:
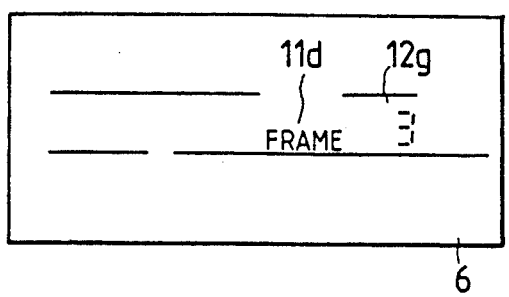

When the select button 7f is further depressed the display is switched to that shown in FIG. 9D. The mark 11d indicates "FRAME" while the two-digit numeral display unit 12b displays 3. This means that the whole number of the frames to be exposed by the bracketing mode is three. The number of frames to be exposed can be changed in a manner substantially similar to that described above; that is, by depressing 7i or 7j.

Figure 9B:
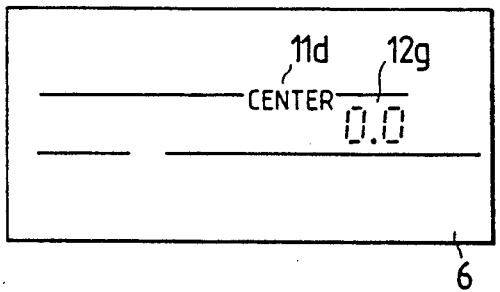
Figure 9E:
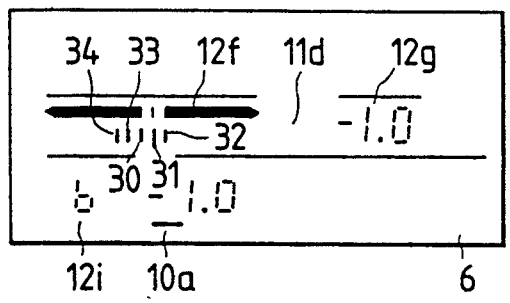

After the conditions have been set as shown in FIG. 9B, C or D, the select button 71 is depressed again so that the display is switched to that shown in FIG. 9E. That is, the center value is 1.0; the step value is unit; and the number of frames to be exposed is five.

Under these conditions set described above, as the exposure proceeds, the correction value added to the value calcualted by the camera chagnes −1.0, 0, +1, 2 and +3 in the order named. As shown, the bar graph 12f displays vertical rod-like segments 30 and 34 including the center vertical rod-like segment. Except the vertical rod-like segment 31, the position of other vertical rod-like segments represent the relations with the correction values and the absolute values of the correction values are not indicated.

Furthermore each of the correction values (−1.0, 0, +1, +2 and +3) can be recorded on each frame of the film. When the mode button 7h is depressed so that the correction value recording mode (in which the data is recorded left recording unit 12i), the display is further switched to that shown in FIG. E. The mark "b" displayed at the left of the screen of LCD 6 indicates the "BKT" mode and the correction value is displayed on the right side of the mark "b". It is apparent that the correction value displayed is coincident with the value displayed by the two-digit numeral display unit 12g.

Figure 9C:
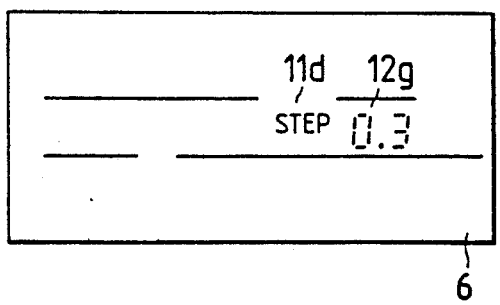
Figure 9F:
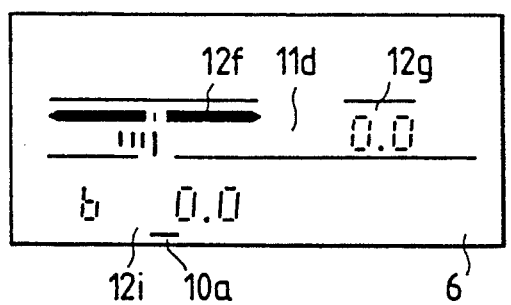

Then the shutter of the camera 1 is released, the display is switched to that shown in FIG. 9F. When one frame is exposed under the conditions displayed in FIG. 9E, the rightmost vertical rod-shaped segment 32 in the bar graph 12f is turned off so as to indicate that one frame is exposed with a corrected value and the two-digit numeral display unit 12g indicates that the correction value for the exposure of the next frame is 0.0. Concurrently, the numeral displayed by the left recording unit 12i is switched to 0.0.

In this manner, the correction value of the next frame is displayed by the two-digit numeral display unit 12g and the rightmost vertical rod-shaped segment is turned off, thereby distinctly displaying the number of frames to be exposed.

Upon completion of exposure of the desired number of frames, the display is reset to that shown in FIG. 9E so that the next exposure can be carried out under the same conditions as described above.

As is seen from FIG. 9A to FIG. 9F, the positions of the vertical rod-like segments 30-34 in the bar graph 12 represent only the number of frames which are exposed with the positive, zero and negative correction values whose absolute values are not indicated. Even when the step value is 0.3 steps as shown in FIG. 9A or is 1.0 as displayed in FIG. 9F, the adjacent vertical rod-shaped segments are spaced apart from each other by a small distance and are displayed in the vicinity of the vertical rod-shaped segment 31. Then the number of frames of the film to be exposed can be distinctly displayed and no large display region is needed.

The conditions for limiting the ranges of the set values are as follows in the case of the embodiment being described:

center value: $-7\frac{2}{3} \leq C \leq 7\frac{2}{3}$

In this case, the $\frac{1}{3}$ and $\frac{1}{2}$ series are arranged.
step value S: $\frac{1}{3} \leq S \leq 2$
In this case, the $\frac{1}{3}$ and $\frac{1}{2}$ series are arranged.
number of frames F: $\frac{1}{3} \leq S \leq 19$ where F is an odd number.

In addition to the above described conditions, total correction value Δ; $-8 \leq \Delta \leq 8$ and the number of frames exposed on the + and − sides; $0 \leq f \leq 9.0$ When it is desired to shift the center value out of 0, it suffices that in addition to the above-described conditions, the number of frames to be exposed on the side of + or − is up to nine. This is calculated as follows:

$$|C+(F-1)/2)\times B| \leq 8 \text{ and}$$

$$F \leq 19.$$

Furthermore, in order to satisfy the condition f, it suffices to counter all the frames on the + side or the − side.

In the cases of changing the set values in FIG. 9B—FIG. 9D, the above-described conditions are expressed as follows.

First in FIG. 9B, after the center value C has been set, the range of the step value S as shown in FIG. 9C is selected within the range defined by the above-described conditions.

For instance, when the center value C is set as $$7\tfrac{1}{3},$$

only the step value $S=\tfrac{1}{3}$ is displayed.

In FIG. 9D, the number F of the frames is displayed within the proper range defined by the above-described conditions. For instance when the center value $$C = 7\tfrac{1}{3}$$

and the step value $=\tfrac{1}{3}$ only F=3 is displayed.

As described above, based upon the previously set conditions, the values which are not excess of the above-described conditions are displayed as the conditions to be set.

When it is desired to change the center value C again after the setting of the center value C, the step value S and the number of frames to be exposed F have been already selected, the center value C can be freely changed. The reason is that as far as the limit has been established based on the step value S and the number F of the frames to be exposed, it becomes impossible to change.

When it is desired to change the center value C again, the center value C remains unchanged if the step value S and the number F of the frames to be exposed are within the limit conditions, but when the latter become the values in excess of the limit conditions, the center value C is reset to the initial value (the default value described above).

Figure 9G:
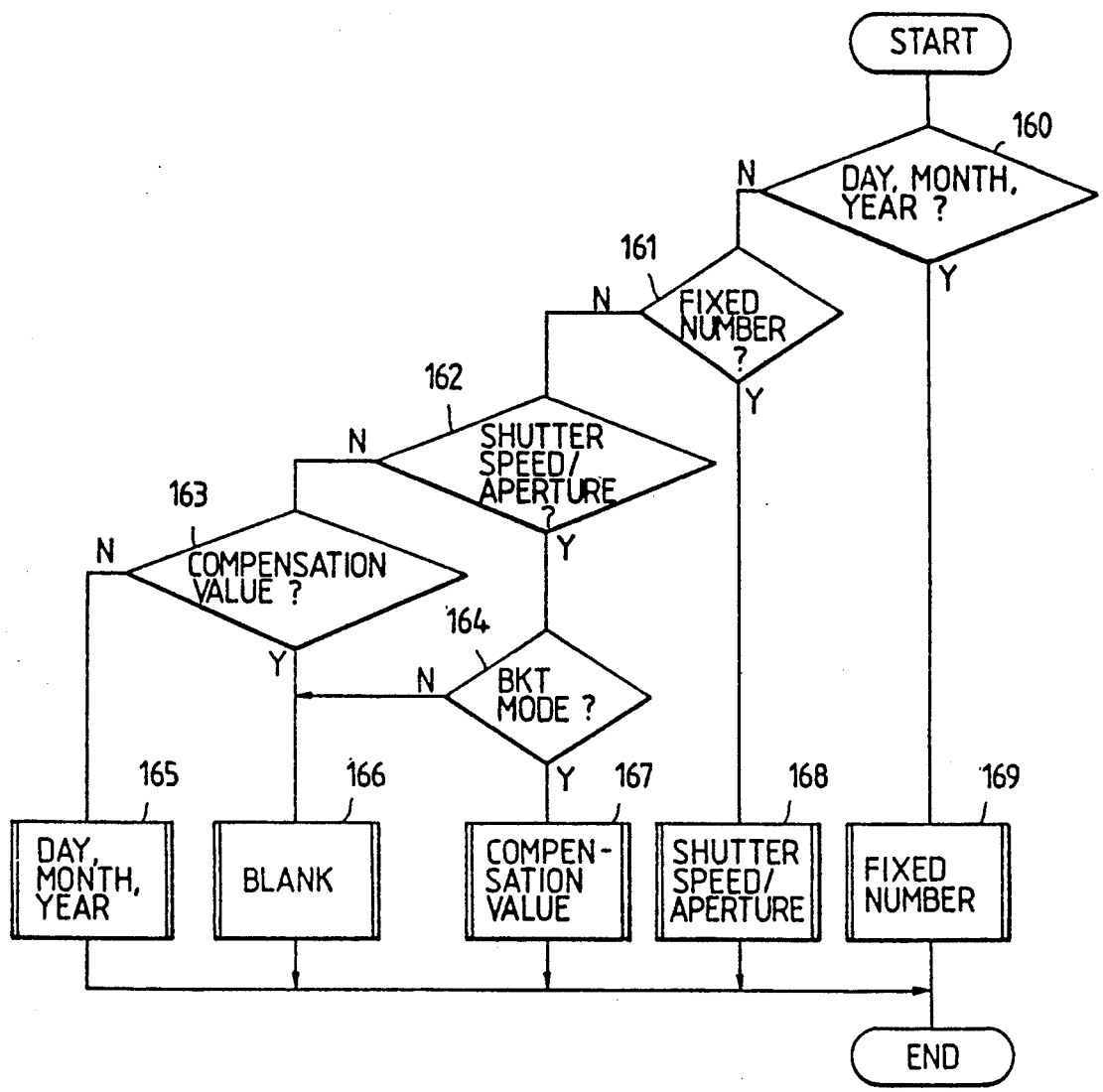

FIG. 9G is a flowchart used to explain how the correction value recording mode shown in the left recording unit 12i in FIGS. 9E and 9F.

A program is so prepared that the setting of the correction value recording mode can be made only when the BKT mode is selected as shown in FIGS. 9A–9F.

First the function button 7e is depressed so that the indicating mark 10a is shifted to below the left-side recording unit 12i as shown. Thereafter when the mode button 7t is depressed in order to change the recording mode, the routine of the program is carried out.

Whether or not the display in the left-side recording unit 12i is "YEAR, MONTH, DAY" is detected in the step (160). When the detection result is YES, "a fixed numerical value" is displayed in the step (169).

The fixed numeral value is the mode to be explained hereinafter with reference to FIG. 14.

When the result of the detection by the step (160) is "NO", it is detected whether or not "a fixed numerical value" in the step (161). When the result of the step (161) is "NO", "an exposure value" is displayed in the step (168), which will be described in more detail hereinafter with reference to FIG. 13.

When the result of the step (161) is "NO", whether or not "an exposure value" is displayed in the step (162). When the result is "YES", it is detected whether or not the BKT mode is selected in the step (164).

When the BKT mode is selected; that is, when the bar graph 12f is displayed as shown in FIG. 9E, "a correction value" is displayed in the left-side recording unit 12i as shown in FIG. 9E in the step (167).

The result of the step (164) is "NO", the blank mode is selected in the step (166) so that the data will not be recorded by the left-side recording unit 12i.

Now returning to the step (162), when the result is "NO", whether "a correction value is displayed or not" is detected in the step (163). When the result is "YES", the blank mode is displayed in the step (166). On the other hand, when the result is "NO", it indicates the blank mode is displayed so that in the step (165) "YEAR, MONTH, DAY" is displayed. Thus the routine is completed.

As described above, whenever the mode button 7h is depressed, the five modes; that is, the "YEAR, MONTH, DAY" mode, the "a fixed value" display mode, the "exposure value" display mode, the "correction value" display mode and the "blank" display mode are switched in the order named. When the BKT mode which is one of the control modes is not selected, it is avoided to display "a correction value"; that is, the data to be set. In other control modes, it is also prohibit the display of "a correction value".

Figure 10:
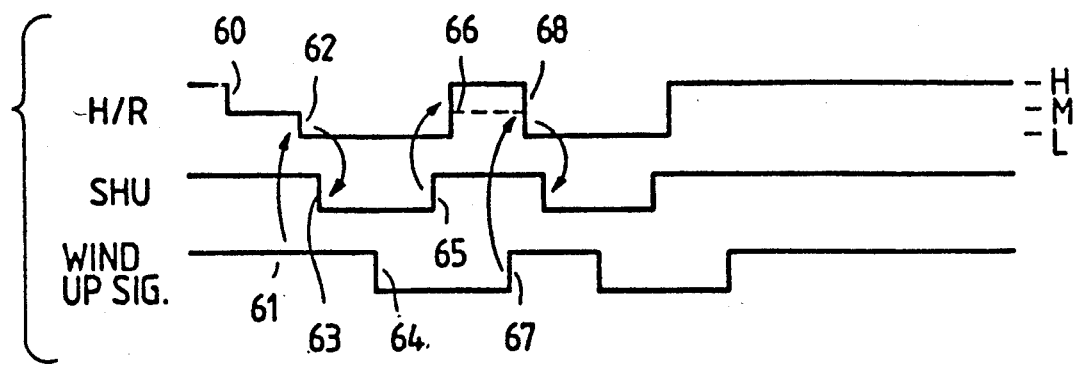
FIG. 10 is a view used to explain another timing chart thereof.

FIG. 10 is a timing chart illustrating the relationships among the signals when a predetermined number of frames are exposed continuously each at a predetermined timing in the INT or BKT mode.

FIG. 10 shows an example in which two frames are exposed at a predetermined time interval. The H/R terminal 22d and the SHU terminal 22e are the signal contacts described above with reference to FIG. 8 and the winding completion signal represents that the film in the camera body 1 is mechanically wound up so that the preparation of the next exposure is accomplished. The winding completion signal is deliver to the data signal (19) or (20) described above with reference to FIG. 4 as a software-like flag and is transmitted through the DAT terminal 22b.

The mode of operation is as follows:

First the data back 5 causes the H/R terminal 22d to go MIDDLE (a middle level) at the point (60) a few seconds prior to a predetermined interval and the winding completion signal in the data signals (19) and (20) is confirmed. In this case, the winding completion signal is HIGH at the point 61, thereby indicating that the film winding operation is accomplished so that as shown at the point (62), the H/R terminal 22d is caused to go LOW. As a result, the camera 1 accomplishes the exposure of the first frame of the film. In response to the above-described operation, the camera body 1 causes the SHU terminal 22e to go LOW at the pont (63).

During the operation camera body 1 switches the winding completion signal as the point (64).

Upon the completion of the exposure operation by the camera body 1, the SHU terminal 22e goes HIGH so that the data back 5 causes the H/R terminal to go also HIGH.

During this time interval, the camera body is carrying out the film winding operation. Upon completion of the film winding operation, the winding completion signal goes HIGH at the point (67). After the confirmation of this switching or reversal, the data back 5 causes the H/R terminal 22d to go LOW so that the second exposure may be made.

Thereafter, as in the case of the exposure of the first frame, the signal exchange between the camera body and the data back is carried out in a manner substantially similar to that described above.

In this embodiment, during the operation the H/R terminal 22d goes HIGH between the points 66 and 68, but the terminal 22d is maintained at a middle level as indicated by the broken lines. With the H/R terminal 22d at a high level, the half step shutter release of the camera body 1 is temporarily interrupted at the time point (66) so that the power supply within the camera body 1 is turned off. The reason is that when the power supply is turned on again at the time point 68, sometimes an extra time is needed when the shutter is completely released due to the initial reset operation, a time interval for waiting for rise time of a photometric amplifier and so on so that the second exposure is made at a time point slightly later than a predetermined second exposure time.

Meanwhile when the camera body 1 is switched to the Bulb exposure mode in the LE mode in which the data back 5 controls an exposure time, the Bulb of the camera body 1 must be essentially utilized so that the exposure completion is depending upon a high level of the H/R terminal 22d because when the H/R terminal 22d is maintained at a middle level, the Bulb operation of the camera body 1 is not accomplished.

Next referring to FIGS. 11A–11C, the film alarm function and the film stop function will be described. These functions serve to alarm the user that a predetermined number of frames of the film have been already exposed. The film alarm generates an alarming sound while the film stop function inhibits the shutter release in addition to the alarm sound.

Setting and operation are carried out as follows.

Figure 11A:
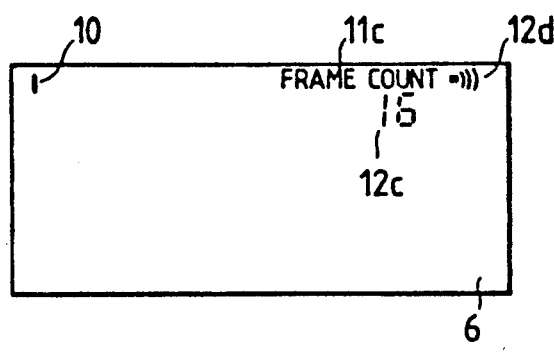

FIG. 11A shows the state before setting in which the "FILM COUNTER" mark 11c in the film frame counting unit 12c indicates that the 16-th frame is to be exposed. In this case, the indicating mark is located in the vicinity of the "INTERVAL" function mark 8a.

Thereafter the indicating mark 10 is shifted by depressing the function button 7e so as to place it in the vicinity of the mark "FILM ALM" 8f. Then, as shown in FIG. 11B, the "FILM COUNTER" mark 11c is turned off while the film frame counter unit 12c flashes, indicating 28. This means that the film alarm function is carried out at the 28-th frame. In this case, when the set-reset button 7g is depressed so that the indicating mark 9f is flashing at the same position, the flashing indicating mark 9f indicates that the film alarm and film stop functions are to be actuated as the exposure proceeds.

A number of exposed frames at which the alarm sound is produced is arbitrarily selected by pushing the up button 7i or the down button 7j while the film frame counter unit 12c is flashing.

Figure 11B:
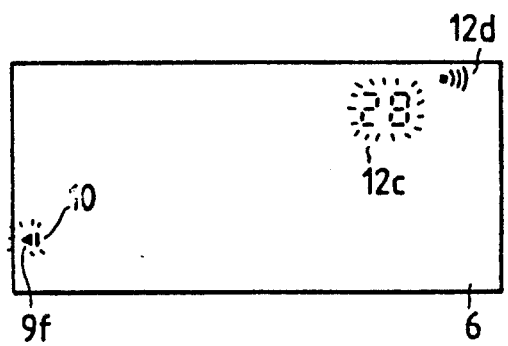

If it is desired to confirm the number of frames exposed in the state as shown in FIG. 11B, the mode button 7h is depressed so that the "FILM COUNTER" mark 11c and the film frame counter unit 12c indicate 16. As a result, after having confirmed the number of frames exposed, a number of frames to be exposed at which the alarm function is actuated can be selected.

Figure 11C:
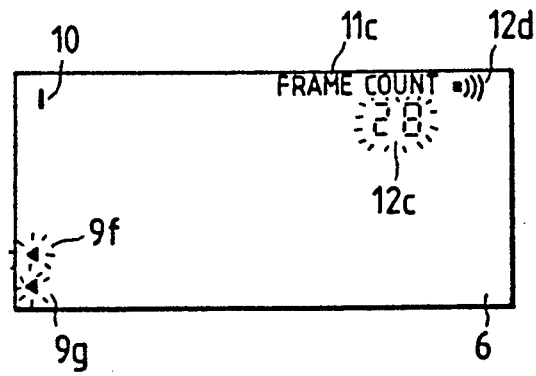

Under the above-described conditions, the exposures proceed and a predetermined number of exposed film at which the alarm function is actuated is reached as shown in FIG. 11C.

In FIG. 11C, the "FILM COUNTER" mark 11c is turned on and the film frame countering unit 12c is flashing the numeral 28, thereby alarming the user.

In this case, the setting mark 9f and the mark 11c are also flashing so that the visual confirmation by the user is facilitated. Furthermore when the alarm mark 12d is turned on, the alarm sound is produced concurrently.

To stop the alarm sound, the alarm button 7d is depressed.

In the film stop mode, the operation substantially similar to that described above is carried out. That is, simultaneous with the generation of the alarm sound, the shutter release operation of the camera body 1 is inhibited. When there is a fear that the trailing end of the film is cut off due to a low temperature, it is possible to stop the winding of the film at, for instance, the 34-th frame.

The simple method for inhibiting the shutter release is as follows. The shutter release inhibition flags in the data signals (21) and (22) delivered from the data back 5 in the manner described above with reference to FIG. 5 are recalled and in response to the detection of the release inhibition flags by the camera body, the latter inhibits the shutter release operation.

In the case of the film alarm mode and the film stop mode, the alarm is stopped when the camera back is opened.

The frame number always displayed by the film frame counter unit 12c is obtained by counting the signals applied to the SHU terminal 22e as described with reference to FIG. 3 by CPU 23 in the data back 5. The counting of the frames is based upon the value of the data signal (19) or (20) shown in FIG. 4 into which is inserted the number counted by the camera body 1 itself.

Because of the above-mentioned reason, the counted number counted by the data back 5 must be detected when the camera back is opened. Furthermore, after loading a roll of film is loaded and the camera back is closed and after the leading edge portion of the film is wound around a spool or the like, the counting of the frames exposed is permitted. Therefore the data signal (19) or (20) shown in FIG. 4 includes a signal representative of the winding of the film leading edge portion around the spool or the like. Before the leading edge portion of the film is not completely wound around the spool, no counting of the frame is carried out. During this time interval, the display by the film frame counting unit 12c remains "0". After the leading edge portion is completely wound around the spool, "1" is first displayed and coincides with a number counted by a mechanical counter incorporated in the camera body 1.

Figure 11D:
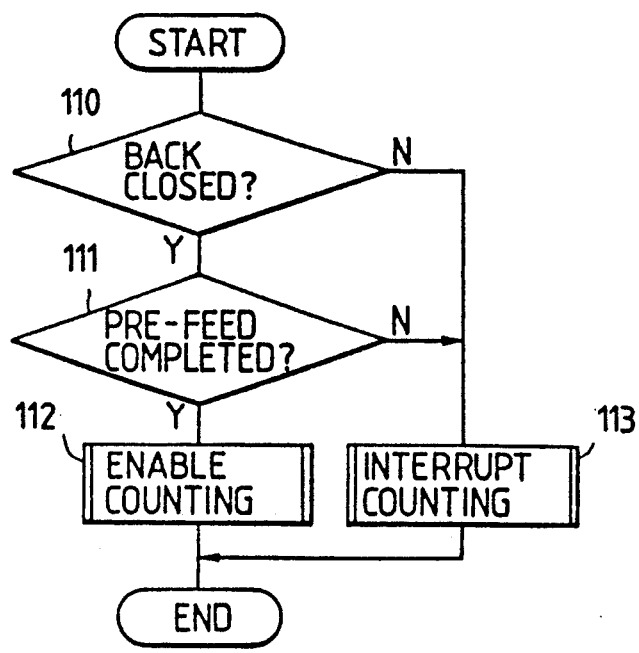

FIGS. 11D and 11E show the programs in the data back CPU 23 in order to carry out the above-described operation.

FIG. 11D shows the decision routine whether or not the counting the pulses appearing at the SHU terminal 22e or the number of exposed frames.

First in the step (110) whether or not the camera back is opened is detected. When the result "YES" whether or not the leading edge portion of the loaded film is completely wound around the take-up spool in the step (111). As described above, the back camera is opened or closed by one of the switches 7 and whether the leading edge portion of the loaded film is completely wound up by the take-up spool or not is detected in response to the detection of the flags contained in the transmission datas (19) and (20).

When the camera back is detected as being closed and furthermore the leading edge portion of the loaded film is completely wound around the take-up spool, the permission for counting the number of the above-mentioned pulses is obtained. In this case, the film frame counting unit 12c first displays "1" and then the number is incremented. The results of the steps (110) and (111) are "NOs", the pulse counting is prohibited in the step (113) and the film frame counting unit 12c remains to display "0".

FIG. 11E shows the flowchart of the program of the operations carried out by the data back CPU 23 when the film alarm mode and the stop mode are selected. The routine is carried out when one of the above-described two modes is selected.

First in the step (114) a number to be counted is read out from a predetermined counter (that is, a counter incorporated in the data back CPU 23). The number to be counted is one obtained when the counting is permitted in the routine in FIG. 11D. In the step (115), whether or not the number reaches a number predetermined by the film alarm mode or film stop mode. When the result is "NO", the routine is returned to the step (114). On the other hand, when the result is "YES", a timer is actuated in the step (116). The timer determines a time point at which the alarm signal is generated and in general operates about 20 seconds.

In the step (117), the film frame counting unit 12c is flashed as shown in FIG. 11B and when the warning sound generating mode is selected, the alarming sound is produced in the step (119).

Next whether or not the above-described operations have been carried out because the film stop mode is selected is detected. That is, whether a predetermined time counting actuated in the step (116) is completed or not is detected in the step (121). When the result is "YES", the release permission mode is selected in the step (124) and the routine is returned to the flashing mode in the step (125) and the alarm sound is stopped in the step (126). In this case, the steps (124) and (126) have no relationship with the preceding steps, but no adverse effect occurs.

Meanwhile even when the film alarm mode is selected and a predetermined time interval is not counted by the timer in the step (121), whether or not the alarm button 7d is depressed in the step (123). Since it is possible to interrupt the alarm sound by the depression of the alarm button 7d in addition to the operation of the timer, the step (124) and its succeeding steps are carried out. When the result of the step (123) is "NO"; that is, when the alarm button is no depressed, the routine that the routine is returned to the step (117) to continue the alarm mode and the alarm mode is interrupted by the depression of the alarm button 7d or by the operation of the timer is repeated.

When the film step mode is detected in the step (120), in addition to the flashing of the display in the step (117) and the generation of the alarm sound in the step (119), the release inhibit mode is selected in the step 122. As described above, the release inhibition flag is established and then the data is transmitted.

The interruption of the alarming operation in the film stop mode can be made only by the depression of the timer so that unless the depression the alarm button 7d is confirm in the step 123, the routine returns to the step (117) to continue the alarm mode. When the alarm button 7d is depressed, the alarming mode is interrupted in a manner substantially similar to that described above.

Figure 11F:
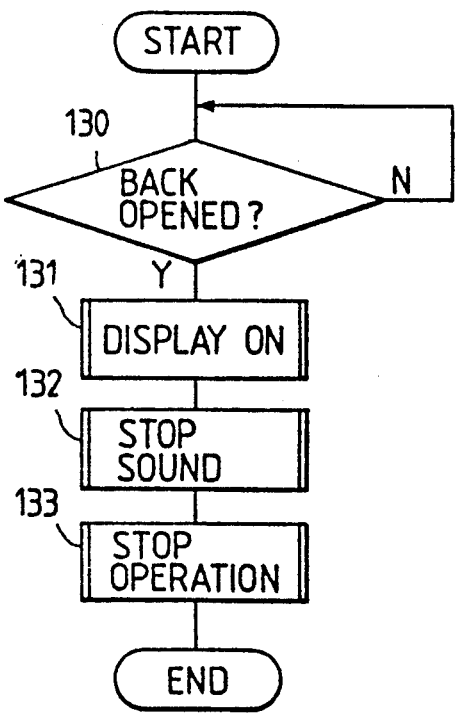

FIG. 11F shows a flowchart of the routine for flashing the display and the interruption of the alarm sound by the data back CPU 23.

This routine is common not only in the film alarm mode but also other all modes. Opening the camera back indicates the interruption of taking photographs by, for instance, removing the exposed film out of the camera body and the operation in each mode is considered not necessary.

When the opening of the camera back is detected in the step (130), the flashing of the display which has been continued is interrupted and the display is turned on in the step (131) and the alarm sound is stepped in the step (132). The interval photography operation and the LE photography operation are not necessary so that they are interrupted in the step (133).

Next the relationship between the operation of the camera 1 and the display by the data back 5 shown in FIG. 3 will be described with reference to FIG. 12.

In this case, it is assumed that the camera 1 is enabled by a certain power supply enabling signal, continues its operation by a timer incorporated therein even after the enabling signal disappears and then is disabled automatically.

The data back starts to display when one of the operation buttons 7a–7j shown in FIG. 1 or in response to the signal (1) applied to the HS terminal 22a from the camera 1 as shown in FIG. 4 and continue the display until the disabling signal from the camera 1 is received.

That is, the combination that as far as the camera 1 is enabled, the display by the data back continues is established.

Figure 12:
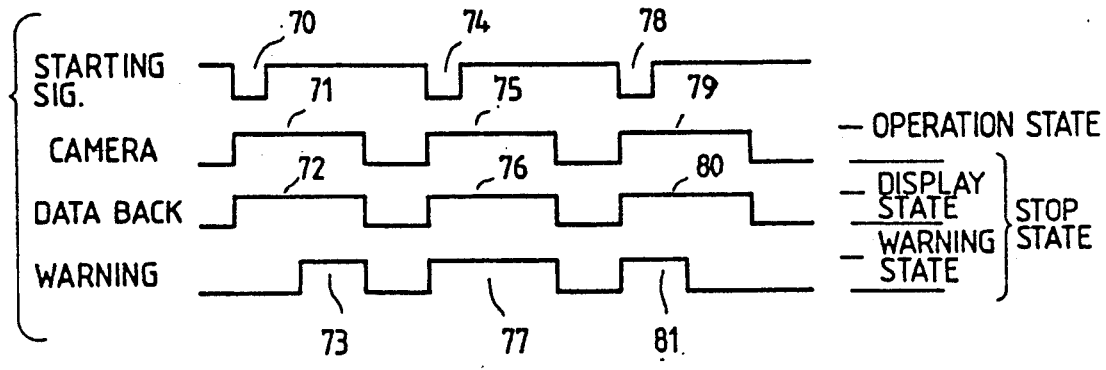
FIG. 12 shows another flowchart thereof.

As shown in FIG. 12, in response to the starting or enabling signals (70), (74) and (78), the levels of the signals from the camera 1 are maintained as shown (71), (75) and (78) and the levels of the signals in the data back 5 are maintained as shown at (72), (76) and (80).

When the operation of the camera 1 and the display by the data back 5 are synchronized with each other as described above, even when the camera 1 is disabled due to the fall of the power supply, the screen of LCD 6 of the data back 8 displays nothing so that the user may easily confirm that the fall of the capacity of the power supply for the camera 1.

When an alarm (73) is produced due to any cause while the data back 5 displays the patterns (72), the operation to be carried out will be described below. In this case, the alarm will not be generated until the depression of the alarm button 7d. For instance, it is assumed that the alarm is generated for a predetermined time interval by a timer in the display alarm mode. The alarm described above is generated only the data back 5 continues its display so that the display disappears during the alarm mode. As a result, in the case of the next display, the alarm continues for a remaining time interval.

As shown in FIG. 12, the alarm mode (73) started during the display (72) by the data back 5 is interrupted together with the interruption of display (72), started again at (77) in synchronism with the display mode (76) and then interrupted again in the manner described above.

However, at this time point, the time interval of the alarm mode does not elapse, in synchronism with the third display (30), the alarm mode (81) is started again. After a predetermined alarm time interval has elapsed, the alarm mode is interrupted even when the display (80) is still continued. That is, the sum of the time intervals in the modes (73), (77) and (81) is a predetermined alarm time interval.

Next referring to the FIGS. 13A-13G, the LE mode will be described.

Figure 13A:
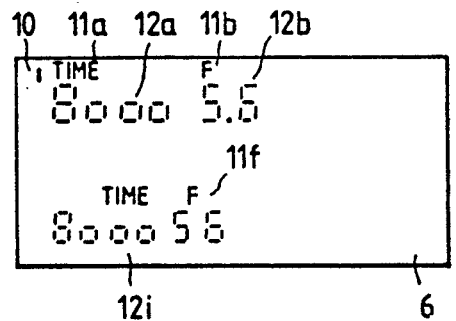
FIGS. 13A–13F are views used to explain another display mode thereof.

FIG. 13A shows the display of an exposure value in the normal case. "8000" is displayed by the four-digit numeral display unit 12a together with the "TIME" mark 11a and "5.6" is displayed by the two-digit numeral display unit together with the "F" mark 11b. These displays are made to facilitate the visual confirmation of the exposure value set in the camera 1 by the user. In this case, the shutter dial 3 of the camera 1 is shown in FIG. 13E. The shutter dial is rotatable and in this case, the pointer mark 82 is in opposing relationship with "8000" marked on the dial 3.

Next the selection of the LE mode will be described. First the shutter dial 3 is so rotated that its mark "B" is in opposing relationship with the index mark 82. In this case, the so-called bulb mode is selected. That is the control mode the exposure is continued until the finger is released from the release button.

Figure 13B:
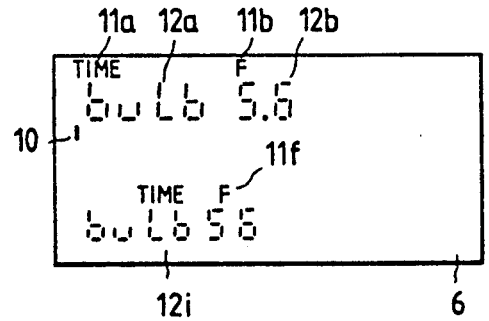

Therefore, as shown in FIG. 13B, the four-digit numeral display unit 12a displays "bulb". In preparation for selecting the LE mode the camera 1 must be first maintained in the bulb mode.

Next the function button 7e is depressed so that the indicating mark 10 is shifted to the "LONG EXP" 8c and when the set-reset button 7g is depressed, the setting mark 9c is displayed at the same place, thereby indicating that the LE mode is selected. Concurrently, the four-digit numeral display unit 12a displays a long-time exposure value previously set as shown in FIG. 13C, where it is assumed that 15 seconds is set and the second digit is displayed by using two segments at the rightmost digit of the four-digit numeral display unit 12a.

When the camera 1 is not set into the bulb mode even when the set-reset button 7g, the four-digit numeral display unit 12a displays a numerical value (that is, 8000 in this embodiment) which flashes a few times, thereby emphasizing the cause why it is impossible to set the LE mode.

Figure 13C:
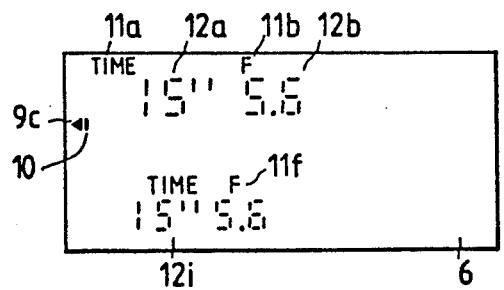

When the up button 7i and the down button 7j are depressed in FIG. 13C, an arbitrary second up to the maximum value "999" can be set.

Figure 13D:
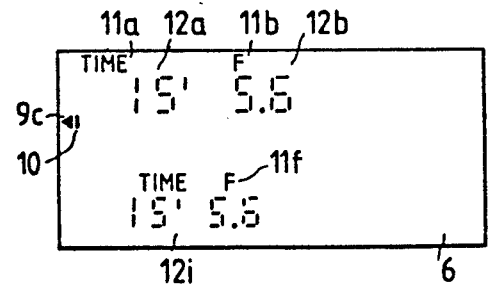
Figure 13E:
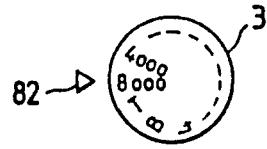

When a "second" is not enough to make an optimum exposure, the select button 7f is depressed so that the unit displayed at the rightmost digit of the four-digit numeral display unit 12a is switched to "minute" as indicated in FIG. 13D. In this case, the numerals in the three digits remain unchanged.

Figure 13F:
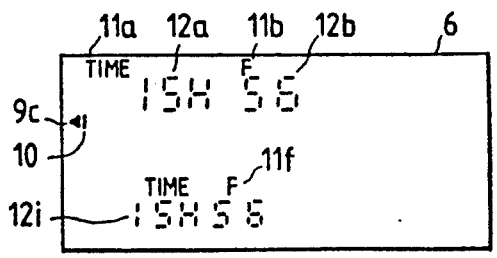
Figure 13G:
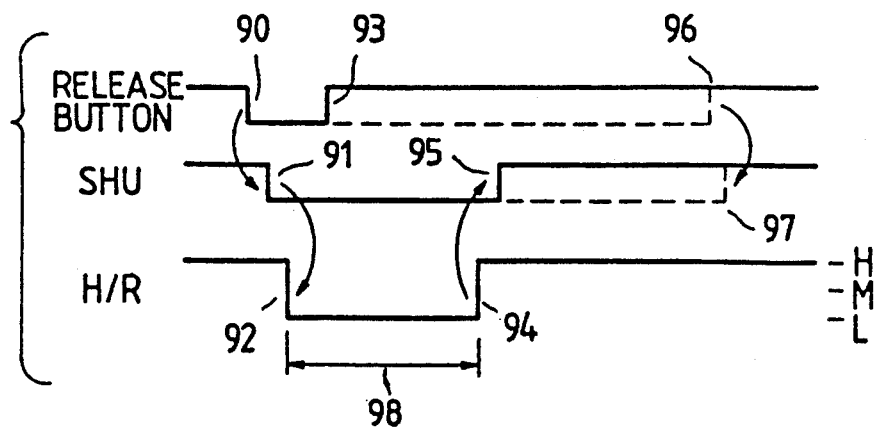
FIG. 13G illustrates another timing chart thereof.

When the select button 7f is depressed again, the rightmost digit indicates "hour" as shown in FIG. 13F. When the select button 7f is depressed further, the initial value previously set is displayed as shown in FIG. 13C.

Referring to FIG. 13C, the relationship between the signals when the release operation of the camera 1 is actuated after the LE mode is selected in the manner described above.

When the release button of the camera 1 is depressed, the data back 5 causes the SHU terminal 22e to switch to a low level at the point (91). Upon detection of this switching or reversal by the data back 5, a time interval (98) set is counted while the H/R terminal 22d is maintained at a low level at the point (92).

Thereafter, the release button of the camera 1 is released (that is, the depression of the release button is interrupted) at the point (93). The camera 1 is essentially maintained in the bulb mode which continues for a predetermined time interval in response to a low level signal from the H/R terminal 22d.

After a predetermined time interval, the H/R terminal 22d goes HIGH at the point (94), the exposure by the camera 1 is accomplished and the SHU terminal 22e goes HIGH at the point (95).

Meanwhile, when the release button of the camera 1 is not released at the time point (93) and is kept depressed, this is indicated by the broken lines.

The H/R terminal 22d goes HIGH at the time point (94), but the release button is kept depressed so that the exposure of the camera can be continued.

When the release button is released at the time point (96), the exposure is accomplished and the SHU terminal 22e goes HIGH at the time point (97).

The exposure values displayed by the four-digit numeral display unit 12a and the two-digit numeral display unit 12b are included in the exchange data (19) and (20) explained above with reference to FIG. 4 and are transmitted from the camera 1 to the data back 5.

The cause why the LE mode cannot be set as described above is due to the exchange data.

When it is desired to interrupt the exposure in the LE mode, it suffices to rotate the shutter dial 3 so that the bulb mark is not in line with the index mark 82 or to depress the start-stop button 7b.

When it is desired to record the exposure values as the data on the film, the left recording unit 12i is switched to the exposure value mode. Then, a shutter speed and an aperture are displayed together with the mark "TIME" and "f" 111f so that the exposure data can be recorded.

Figure 13H:
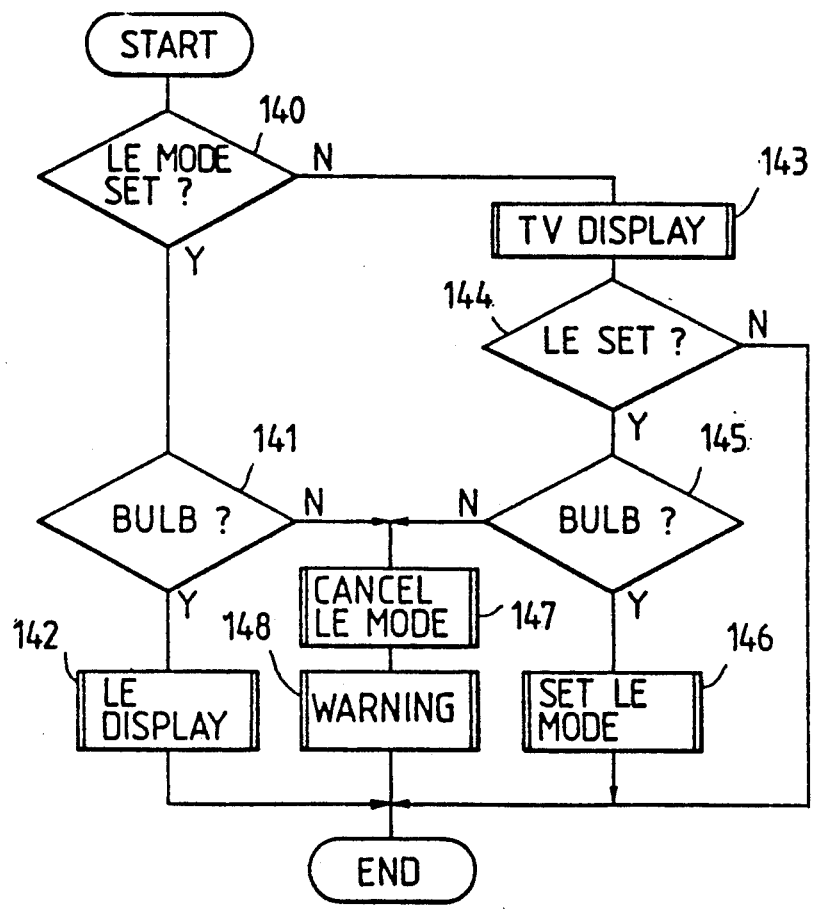
FIGS. 13H and 13I illustrates a still another flowchart thereof.

FIG. 13H shows a flowchart of the program for carrying out the operations in the LE mode by the data back CPU 23.

In the first step (140), it is detected whether or not the LE mode is selected and when the result is "YES", it is detected in the step (141) whether or not the camera 1 is set to "BULB". When the result is "YES", the continuation of the LE mode is permitted so that the displays associated with the LE mode are displayed in the step (142). It is assumed that the step (142) includes a program routine for changing an exposure time.

When the result of the step (141) is "NO"; that is, the BULB mode is released so that it is impossible to continue the LE mode, the LE mode is released in the steps (147) and (148) and the alarm signal is indicated by flashing of the associated displays including the indicating mark 9c.

Meanwhile the result of the step (140) is "NO", a TV (shutter time) value bases on the exchanged data is displayed in the step (143) and it is detected whether or not the LE mode is set in the step (144). Thus means while the routine is carried out, the detection whether or not the set-reset button is depressed.

When the result of the step 144 is "NO", this routine is terminated because the normal mode is selected.

When the result of the step (144) is "YES", it is conformed whether or not the camera 1 is switched to the BULB mode in the step (145). When the result of the step (145) is "YES", the LE mode is permitted and displayed in the step (146). When the result of the step (145) is "NO", the alarm signal is generated and displayed in the steps (147) and (148), respectively, so as to alarm the user that the LE mode is not selected.

Figure 13I:
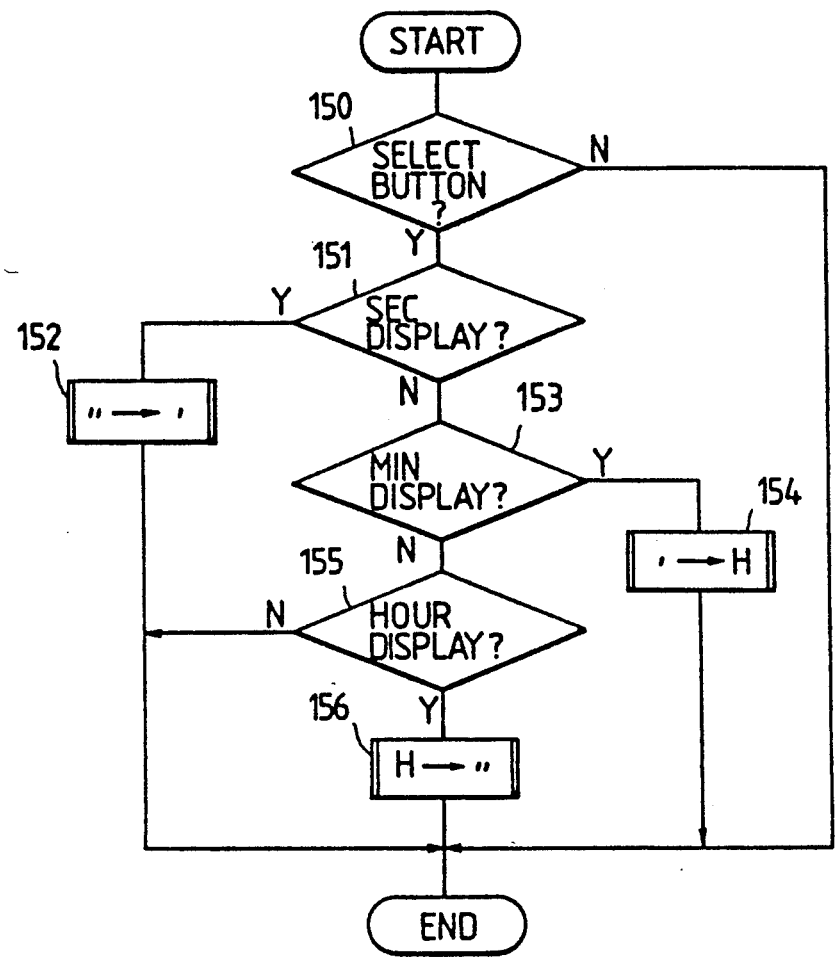

FIG. 13I shows as flowchart of the program of the data back CPU 23 for selecting the units of an exposure time shown in FIGS. 13C, 13D and 13E.

First whether or not the select button 7f is depressed is detected in the step (150). When the result is "NO", the routine is terminated without carrying out any step. But when the result is "YES", it is displayed that the unit of a display is "second" in the step 151. When the "second" unit is displayed, the unit display is switched to the "minute" unit in the step (152). When the result of the step (151) is "NO", it is detected whether or not the unit is second in the step (153) and when the result is "YES", the unit display is switched to the "hour" display.

When the result of the step (153) is "NO", whether or not the unit display is "hour" is confirmed. When the result is "YES", the unit display is switched to the "second" display in the step (156).

When the result of the step (155) is "0", it is detected that the mode for switching time units is not set and the routine is terminated.

Figure 14A:
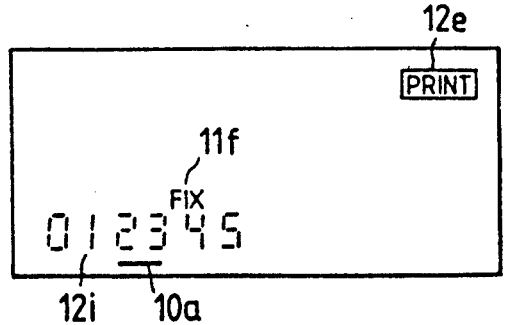
FIGS. 14A and 14B illustrate a still another timing chart thereof.

Next referring to FIGS. 14A and 148, the mode of recording a fixed numerical value will be described. First the function button 7 is depressed so that the indicating mark 10 is shifted to the left-side recording unit 12i and next the mode button 7f is depressed so that a fixed numerical value previously set is displayed together with the "FIX" mark 11f by the left-side recording unit 12i. In this embodiment, it is assumed that the fixed numerical value is "012345".

Under the above-mentioned conditions, the shutter of the camera 1 is released. Since the print mark 12e is turned on, the fixed numerical value is recorded on the film.

The switching of the fixed numerical value is substantially similar to that described above with reference to FIG. 5C. That is, each two-digit is incremented or decremented by the depressing the select button 7, the up button 7i and the down button 7j.

Of the six digits of the fixed numeral value, it is not needed to record one or more digits, it is possible to make a blank in the manner described above.

Figure 14B:
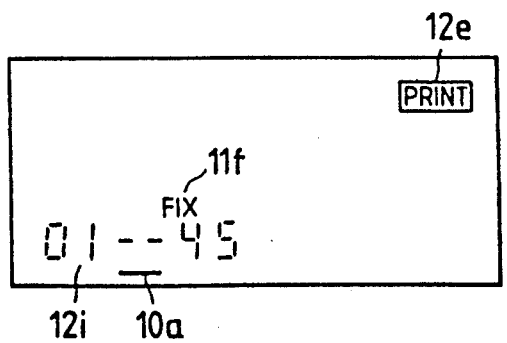

Two digits which are desired to be made blank are caused to flash by depressing the select button 7, "--" mark representative the existence of a blank between "00" and "99" when the up button 7i and the down button 7j are depressed flash. When the select button 7f is depressed twice, the display as shown in FIG. 14B appears.

Under the above described conditions, the shutter of the camera 1 is released so that "45" is recorded at the place where the blank for two digits is provided. As described above, the mark "--" is only for display and does not recorded in the recorded data.

Figure 15:
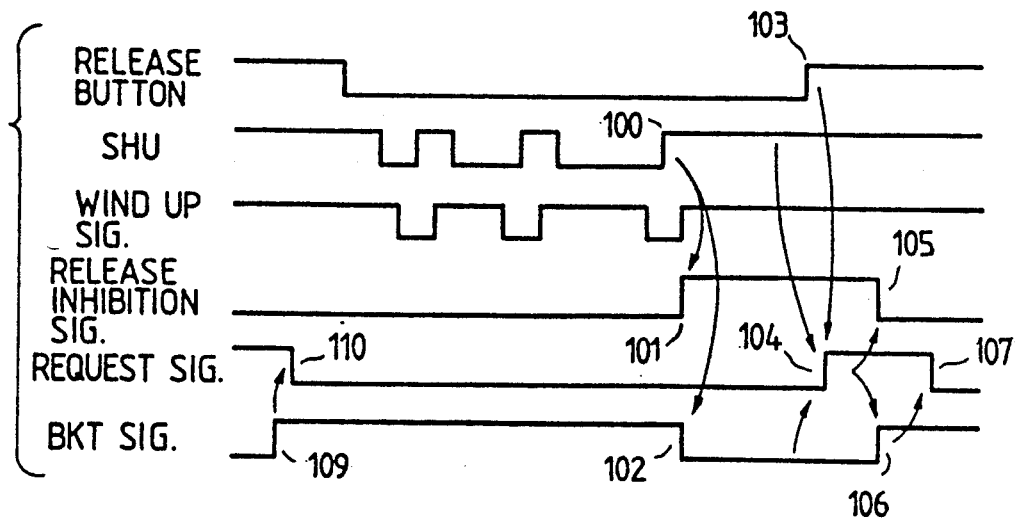
FIG. 15 illustrates a further timing chart thereof.

Referring next to FIG. 15 illustrates the relationships of signals of the camera 1 and the data back 5 in the BK mode described above with reference to FIGS. 9A-9F in the form of a timing chart.

In FIG. 15, the WIND-UP signal and the REQUEST signal are inserted into the data signal (19), (20) or (24) shown in FIG. 4 which in turn is transmitted from the camera 1 while the RELEASE INHIBIT signal and the "BKT" signal is inserted in the data signal (21), (22), or (25) which in turn is transmitted from the data back 5.

In the normal mode the camera 1 causes the REQUEST signal to go HIGH, which represents that the preparation of setting the BKT mode is accomplished.

Under this condition, the BKT button 7c of the data back 5 is depressed. Then the displays associated with the BKT mode described above with reference to FIGS. 9A-9F are started and the BKT signal at a high level is transmitted from the data back 5 to the camera 1 at the time point (109). In response to the transmitted signal, the camera 1 cause the REQUEST signal to go LOW.

Thereafter when the shutter release button of the camera 1 is depressed, the exposure is carried out. Until the RELEASE INHIBITION signal goes HIGH or the BKT flag goes LOW, the camera 1 repeats the exposure operations as will be described in detail hereinafter.

When correction value whose essential roll is to change the correction value each time when one frame of the film is to be exposed is based on the data inserted in the signal (21), (22) or (25) transmitted from a data back 5 as shown in FIG. 4 and the display by the camera 1 is made in response to the signal contained in the data (21) or (22). In the case of the actual operation control, the correction is made based on the signal contained in the data (25) after the shutter release.

The number of exposures made in the BKT mode is detected by counting the number of switching to a high level of the SHU terminal 22e and in this embodiment it is assumed that the exposures be accomplished at the time point (100).

Now the RELEASE INHIBITION signal is switched HIGH at a point 101 so that the shutter release operation of the camera 1 cannot be carried out any longer and the BKT signal is switched to LOW at a point (102).

As the result the operation of the camera 1 is interrupted, the user releases his/her finger from the shutter release button. In this case, the CPU 21 incorporated in the camera 1 detects that the state at the time point (103) and the SHU terminal 22e is switched back to a high level. Under the condition that the BKT signal is maintained at a low level in addition to the above-mentioned conditions, the REQUEST signal is switched to a high level at a time point (104).

In response to the reception of the REQUEST signal which is maintained at a high level, the data back 5 cause the RELEASE INHIBITION signal to go LOW at a point (105) so that the shutter release may be permitted. Concurrently the BKT signal is caused to go HIGH at a point (106) and then transmitted.

In response to the reception by the camera 1 the BKT signal which is maintained at a high level, the REQUEST signal is switched to a low level at a point (107).

Thus a series of exposures in the BKT mode is carried out from the first frame of the film.

In FIG. 15, it has been described that the operation is carried out after the release button of the camera 1 is released after a predetermined exposures are accomplished. However, the relationship between the signals is established in the manner described above so that it is possible to start a series of exposures when the release button is depressed for a very short time at the start of the exposures without keeping depressing the release button.

The reason why the correction value used in the actual operation control is based on the signal inserted in the transmission data (25) after the shutter release is that a high degree of reliability can be attained when the data available as immediately as prior to the control operation.

In order to interrupt the exposure in the BKT mode, it safices to depress the button 7. At this time point, the BKT signal goes LOW so that the camera 1 does not release its shutter any longer.

Figure 16A:
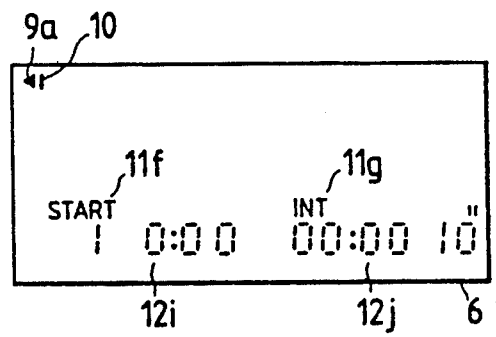
FIGS. 16A–16C and FIGS. 17 and 18 are views used to explain a still further display mode thereof.
Figure 16B:
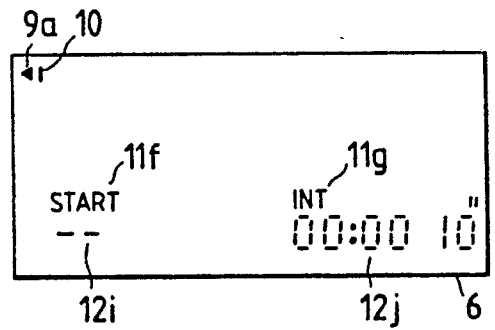
Figure 16C:
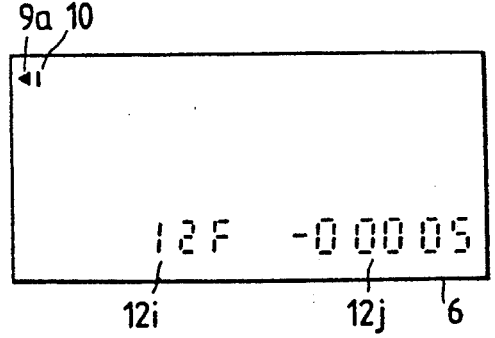

Next referring to FIGS. 16A-16C, the method for setting various conditions to select the INT mode.

First the function button 7e is depressed to shift the indicating mark 10 to the position adjacent to the INTERVAL mark 8a. Then the exposure start time displayed in the left-side recording unit 12i, the START mark 11f, an interval mark displayed in the right-side recording unit 12j and the INT mark 11g are turned on.

The embodiment shows that the exposure is started from "the first day, o'clock and 0 minute" at an time interval of 10 seconds. But the numeral values may be changed by depressing the up button 7i and the down button 7j after the select button 7f is depressed so as to flash a desired digit.

INT mode exposure may be started first by turning on the setting mark 9a by depressing the set-reset button 7g and then by depressing the start-stop button 7b.

When the counting of a time interval is started, the setting mark 9s starts flashing, thus indicating that the exposures are made in the INT mode. The setting mark flashes onto only during the counting a time interval in the INT mode but also in other modes such as DELAY mode, LE mode and DAYLY ALARM mode all of which are associated with the timing counting operation, thereby informing the user that one of the above-described modes is carried out.

In FIG. 16A, the exposure starting time is set by the left-side recording unit 12i, but when the start-stop button 7b is depressed, the display when the exposure is immediately started is shown in FIG. 16B. As shown when the display by the left-side unit 12i is switched to "--", the immediate exposure is possible just described above. The mark "--" appears between "31-th" day (or 28-th, 29-th or 30-th day) and" the first day "when the digit corresponding the day in the display shown in FIG. 16A. In this case, the displays showing the time and the minute are turned off.

After the exposure starting time and the time interval have been set in the manner described above, the mode button 7h is depressed so that the mode is switched to the mode in which the number of exposed frames and the number of exposures made are display as shown in FIG. 16C. The left-side recording unit 12i shows the number of continuously exposed frames by one exposure timing while the right-side recording unit 12j indicates the number of exposure timing for exposures. In this embodiment, in response to the one exposure timing, 12 frames are exposed and the exposure timing is repeated five times so that the total number of 60 frames are exposed.

After the above-mentioned setting, the mode button 7h is depressed again. Then the right-side recording unit 12j so that the display mode for recording set immediately the display is shown as shown in FIG. 16A. For instance, the display is made as shown in FIG. 6A.

As described with reference to FIG. 3, the data back 5 in accordance with the present invention, the exterior display is shown on the screen of LCD 6 while the data recording is carried out by LEDs 26 and 27. As a result, regardless of the contents of the display shown on the screen of LCD 6, the data recording may be carried out at any arbitrary selected time. For instance, even flashing representing the change of data continues, the data at this time point can be recorded.

It follows therefore that, as shown in FIG. 16A-16C, when the exposure is made when the conditions for setting the INT mode are being displayed, these data are not recorded, but the data set in FIG. 6A are recorded.

When another mode is combined with the INT mode, the time interval set in the INT mode cannot be shorted less than the exposure time set in the LE mode. Conversely it is possible to increase the exposure time longer than the time interval previously set.

Figure 17:
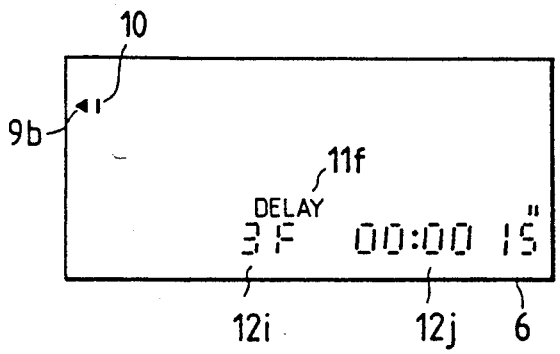

FIG. 17 illustrates the method for setting the DELAY mode. First the function button 7e is depressed so as to shift the indicating mark 10 to the position adjacent the "EXP DELAY" mark 8b. Then as shown in FIG. 17, the number of exposed frames (three frames in the embodiment) is displayed by the left-side recording unit 12i and the remaining time interval (15 seconds in the embodiment) prior to the exposure starting and the DELAY mark 11f are displayed by the right-side recording unit 12i. Any conditions set can be changed in the manner described above with reference to FIGS. 16A-16C.

When the start-stop button 7b is depressed after the setting mark 9b is turned on, it flashes and in the case of the embodiment three frames are continuously and sequentially exposed after 15 seconds.

Figure 18:
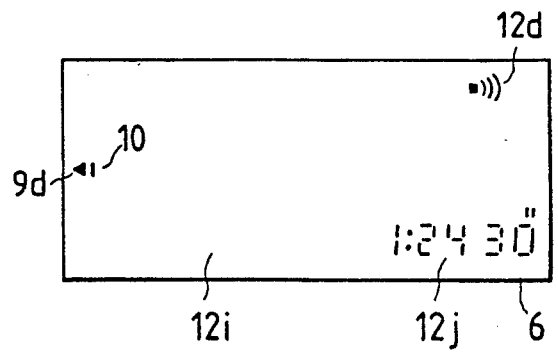

FIG. 18 illustrates the method for setting the DAYLY ALARM mode. First the function button 9e is depressed to shift the indicating mark to the position adjacent to the ":DIALY ALM" mark 8d. Then as shown in FIG. 18, the "HOUR", "MINUTE" and "SECOND" are displayed by the right-side recording unit 12j.

In this embodiment, the LCD screen 6 shows "1 o'clock", "24 minutes" and "30 seconds" are displayed. The method for changing the conditions is substantially similar to that described above with reference to FIG. 16A-16C.

When the setting mark 9d is turned on, the display is switched to that shown in FIG. 18 every day at the displayed time and flashes together with the setting mark 9d. Furthermore, when the alarm mark 12d is turned on, the alarm sound is produced.

As described above, with the data back in accordance with the present invention, only when the BK mode is set, one of a plurality of modes (concerning the data required for setting the control mode), the data associated with the control mode from the data recording mode (associated with the fundamental data), the data concerning the control mode and for instance a selected correction value (data) can be recorded on the film. Furthermore when the data recording device is not set in the control mode, of a plurality of above-mentioned modes which can be recorded on the film, the data required for setting the device into the control mode is automatically eliminated. As a result, in the case of the selection of a desired mode, meaningless modes will not appear so that the erroneous operation can be prevented.

Second Embodiment, FIGS. 19-FIGS. 23

Figure 19:
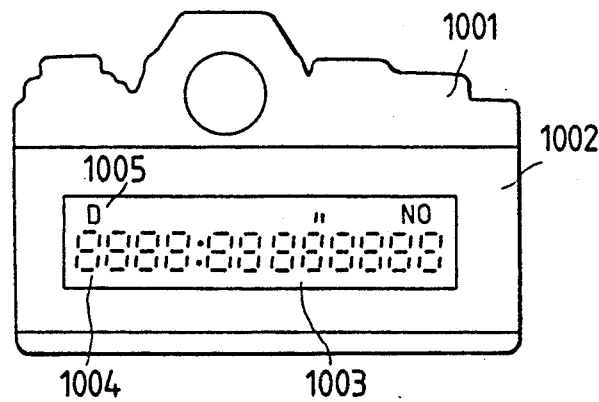

FIG. 19 shows a rear view of a second preferred embodiment of the present invention.

The data back 1002 is mounted on the camera back of the camera body 1001. An exterior display LCD 1003 is provided so that various data set by the user may be seen from the exterior of the camera body 1001. Furthermore there are provided a data recording unit consisting of an array of LEDs (not shown) and a data changing unit (not shown) for changing the data to be recorded by an operating button or the like.

The LCD 1003 has a 7-segment display unit 1004 consisting of 12 digits and plural symbol marks 1005 displaying alphabets.

The 12-digit 7-segment display unit 1004 is so designed and arranged that it fundamentally displays 6 digits as a unit at a time. For instance, in FIG. 19, 6 digits on the left side display a calendar data while the 6 digits on the right-side display the number of frames of a film. It must not be noted here that the above-described division into two 6-digit units is not fixed. For instance, in order to display the calendar data in more detail, in addition to 6 digits in the left-side unit, one or more digits in the right-side unit display so that a numeral higher than 6 digits may be displayed.

Figure 20A:
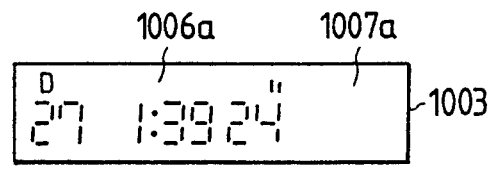
FIGS. 20A–20C are views used to explain the mode of a display unit.
Figure 20B:
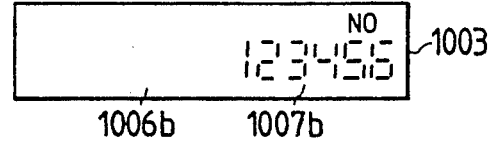
Figure 20C:
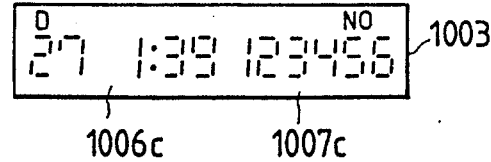

FIGS. 20A-20C shows display modes by the 7-segment display unit 1004.

FIG. 20C shows the most typical display. "27-th day, one o'clock and 39 minutes" is displayed by the 6-digit left-side calendar data 1006 while the 6-digit right-side frame number data 1007c indicates "12345" frames.

If the contents of the calendar data 1006c are not sufficient to display a "second unit", the data changing unit is so operated that it displays nothing and then it is further operated again so as to change the calendar 1006c.

As a result, as shown in FIG. 20A, the calender "27-th day, one o'clock, 39 minutes and 24 seconds" 1006c is displayed by the seven-segment display unit 1004, whereas the data concerning to the number of frames of the film is not displayed; that is, the data display is blank.

After the data is displayed in the manner described above, when the detailed calendar display 6C becomes not necessary and furthermore when it is desired to display the data concerning with the number of frames of the film, the data changing unit is so operated that the "second" unit in the calendar data 1006a disappears. Then the fundamental display as shown in FIG. 20C appears again.

Furthermore it is possible to operate the data changing unit in such a way that the calendar display 1006 does not appear but only the film data 1007b is displayed.

Figure 21A:
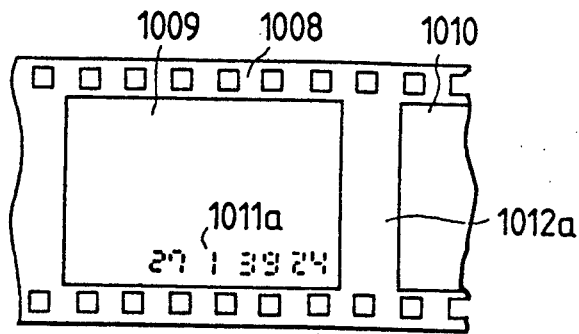
FIGS. 21A–21C are views used to explain how data are recorded on the surface of a film.
Figure 21B:
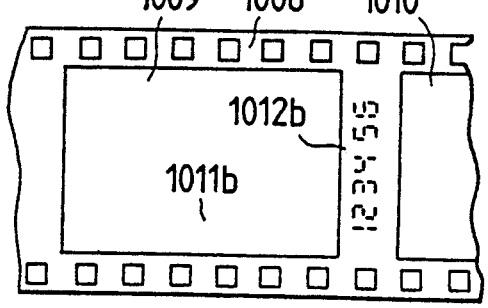
Figure 21C:
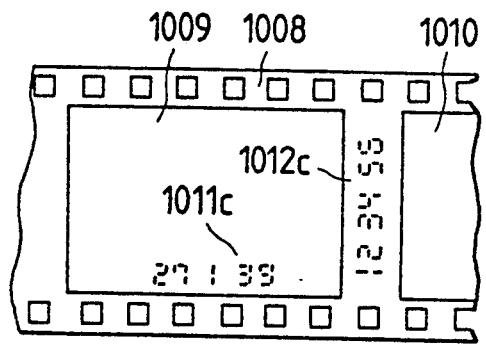

FIGS. 21A-21C illustrate the data recorded on the film 1008 by the data recording unit (not shown) incorporated in the data back 1002 and correspond to the displays shown in FIG. 20A-FIG. 20C.

That is, FIG. 21A illustrates that the calendar data "27-th day, one o'clock, 39 minutes 24 seconds" is recorded at the lower right portion of the frame 1009 of the film 1008, but since FIG. 21A does not display the film data, the film data is not recorded in the space 1012a between the frames 1009 and 1010.

FIG. 21B illustrates film in which no film data is recorded at the lower right portion 1011b of the frame 1009, but the film data 1007b shown in FIG. 20B is recorded in the space 1012b between the FIG. 21C illustrates that the calendar data displayed as shown in FIG. 20C is recorded as the calendar data 1011c at the lower right portion of the frame 1009 and the film data is recorded in the space 1012c between the frames 1009 and 1010.

As described above, when the exterior LCD 1003 can display 12 digit segments, thereby indicating various data, but the data recording LED must have 8 digits for recording a data within a frame and further 6 digits for recording data in the space between the adjacent frames.

Figure 22:
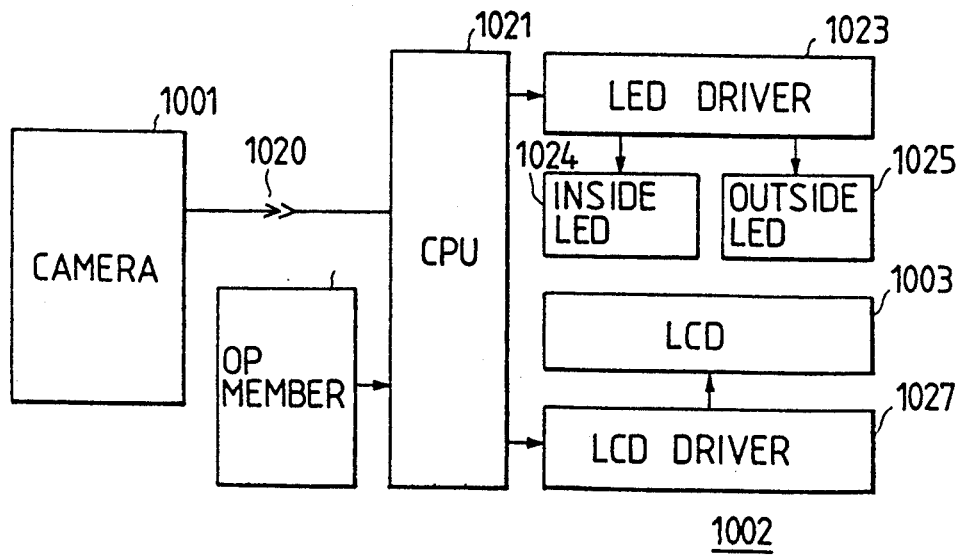

FIG. 22 illustrates a block diagram of an electronic circuit in the second embodiment.

The camera body 1001 and the data back 1002 are electrically interconnected with each other through the contacts 1020 which is so designed and constructed as to generate a timing signal upon depression of the shutter release button or the like of the camera body 1001.

The data back 1002 includes a control unit 1022 having various control buttons, CPU 2021 to which are delivered the output signals from the operating unit 1022, a LED driver 1023 for controlling ON-OFF operations of a first group of LEDs 1024 for recording the data within the frame and a second group of LEDs 1025 for recording the data in the space outside of the frame in response to the control signal transmitted from the CPU 1021 and a LCD driver 1027 for controlling an exterior LCD 1003.

Next the mode of operation of the data back with the above-described construction will be described. When one of the control buttons in the operating unit 1022 is depressed, the signal corresponding to the depressed control button is delivered to CPU 1021. which in turn delivers the control signal to the LCD driver in response to the signal transmitted from the control unit 1021. As a result, in response to the operation of the operating unit 1022, the data are displayed as shown in FIGS. 20A-20C.

After the desired data is displayed, the camera body 1001 is released. Then the timing signal (the recording signal) is delivered through the contacts 1020 to CPU 1021. The CPU 1021 switches the display data (control signal) which has been delivered to the LCD driver 1027 to the LCD driver for a predetermined time interval so that LEDs 1024 for recording the data inside the frame as well as the LEDs are flashed during the above-mentioned predetermined time interval.

As a result, the data as shown in FIGS. 21A-21C are recorded by the LEDs 1024 for recording data within the frame and the LEDs 1025 for recording data outside the frame. Thus the data recording and the data display are carried out.

Figure 23:
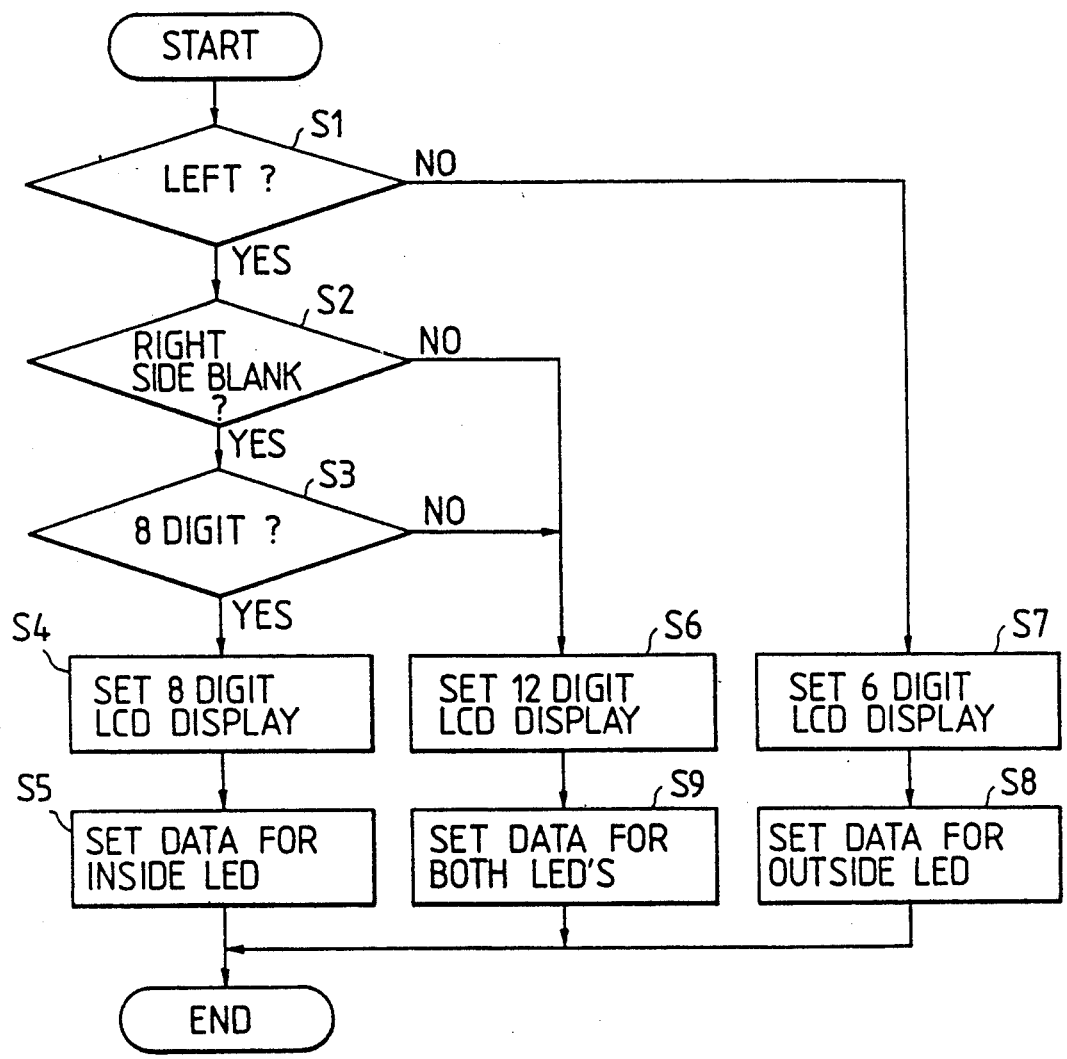

FIG. 23 illustrates the storage of the setting data in CPU 1021.

The routine is started and executed in response to the operation signal generated by the operation of the operating unit 1022.

In the step S1, it is detected whether or not the data set by the operating unit 1022 concerns with the six digits on the left side in LCD 1003. Then the result is "YES", whether or not the six digits on the right side of LCD 1003 is blank on the right-side of LCD 1003 is detected in the step S2. When the result of the step S2, it is detected in the step S3 whether or not the six digits on the left-side are so set as to require the data consisting of 8 digits.

When the result of the step S3 is "YES", in the step S4, the exterior LCD 1003 is so set as to display the data consisting of 8 digits by using the 8 digits on the left-side and the two digits on the right-side. Thereafter in the step S5, the LEDs 1024 for recording the data within the frame is so set as to be turned on. Thus the storage routine is accomplished.

Means while the result of the step S1 is "NO" so that the command signal concerns with the 6 digits on the right-side of the external LCD 1003, the latter is so set as to display the data by the six digits on the left-side. In the step S8, LEDs 1025 for recording the data outside of the frame are set in a manner substantially similar to that described above to be turned on. Thus, the storage routine is accomplished.

When the result of the step S2 is "NO"; that is, the six digits in LCD 1003 are not blank and furthermore when the result of the step S3 is "NO"; that is, the six digits on the left-side does not require the data consisting of 8 digits, the data required for 12 digits of LCD 1003 are set in the step S6. Thereafter in the step S9, both of the LEDs 1024 and 1025 for recording the data within the frame and outside of it, respectively are set to be turned on. Thus the storage routine is accomplished.

In the second embodiment it has been described that two LED systems are required for recording the data within and without the frame, but it is to be understood that LEDs for 12 digits are provided so that the data displayed as shown in FIGS. 20A-20C by LCD may be recorded within the frame.

Furthermore it is so designed and constructed that in order to record the data on the film, a character pattern defined by LCD is projected by a lamp.

As described above, according to the second embodiment of the present invention, the external display area of the exterior display means is divided, for instance, into two areas so that the different data may be recorded in respective areas.

Therefore, when the data displays are less as in the case of the general exposures, one area may be used to display the data while when it is desired to record various data as in the case of the professional photographer, a desired data may be recorded in all of the two areas or one area plus a part of the other area.

Thus, it becomes possible to display various data without increasing the number of digits of LCD which is used as an exterial display means, the above-mentioned high performance data recording device can be mounted on the camera so that the additional advantage of the camera can be much enhanced.

Third Embodiment, FIG. 24–FIG. 28

FIG. 24 is a rear view of a camera in accordance with the present invention, on which a long-length film back to be described in more detail hereinafter will be mounted.

Instead of the camera back, a film back B1 is attached to the rear side of the camera C and is a conventional type. Furthermore it is not a long-length film back. The camera C incorporates a film counter display unit 2001 which is a electrooptical displaying means using a LCD. The counter display unit 2001 may be incorporated within a viewfinder, but in the third embodiment, it is disposed as shown in FIG. 24 for the sake of simple explanation. A film counter display unit 2002 is incorporated in the film back B1 in order to count the number of exposed frames of a film loaded in the camera back B1.

A display unit 2003 for displaying the data to be recorded displays various data concerning with an exposure such as a data when the exposure was made. Push buttons 2004a–2004d constitute a data setting and changing unit for the film back B1.

For instance, when the push button 42a is depressed, it becomes possible to flash one of "YEAR", "MONTH" and "DAY" displayed by the display unit 2003. Thereafter the push button 2004c or 2004d depressed so that "YEAR", "MONTH" or "DAY" can be incremented or decremented. The push button 2004d has the function for deciding whether or the exposure data is recorded.

FIG. 25 is a rear view of the third embodiment with a long-length film back B2 mounted on the camera C. It is to be noted here that same reference numerals are used to designate similar parts throughout the third embodiment and the explanation of the parts which has been already made will not be repeated.

The long-length film back B2 is provided with a decrementing counter to be described below and the decrementing mode is carried out for a predetermined time interval when the push or incrementing button 2004c and the down or decrementing button 2004d are simultaneously depressed. In this case, a decrementing display mark 2002a flashes, indicating the decrement mode is selected.

In the case of switching from the decrement mode to the increment mode, the operation substantially similar to that described above is carried out, but in this case, the decrement mark 2002a is turned off. In the third embodiment it is assumed that both the electric circuits incorporated in the film backs B1 and B2 be same.

FIG. 26 is a block diagram illustrating the relationship between the electric circuit in the camera and such long-length film back. Display means 2001 and 2002 and push buttons 2004c and 2004d function substantially same as those described above. The display means 2001 on the side of the camera C and the display means 2002 on the side of the film back are aligned with each other, enabling to display a three-digit numerical value.

When the film back is mounted on the camera C, contacts 2010a and 2010b are interconnected so that the data exchange between CPU 2005 incorporated in the camera C and CPU 2006 incorporated in the film back becomes possible.

An up counter 2007 is incorporated in the camera C so as to memorize the number of frames of a film on the side of the camera C and the counting is carried out by counting up the signals generated in synchronism with the exposures such as the sync contact signals.

Meanwhile the film back incorporates therein an up counter 2008 and a down counter 2009. The up counter 2008 counts up the signals generated whenever the camera operation is made. On the other hand, the down counter 2009 is initially set a predetermined number and counts down the signals generated whenever the exposure is made.

The results obtained from the up and down counters 2008 and 2009 are delivered to CPU 2006. When CPU 2006 is operated in the increment mode, the incremented numerical value is displayed by the display means 2002. On the other hand, when CPU 2006 is operating in the decrement or down mode, a decremented numerical value is displayed by the display means 2002.

The above-described operations of CPU 2006 can be switched in response of ON-OFF operation of a detecting switch 2011. That is, when the long-length film back B2 is mounted on the camera C, the detecting switch 2011 is turned on so that CPU 2006 operates in the increment or decrement mode. But when the film back B1 is mounted, the detecting switch 2011 is turned off so that CPU 2006 operates in the increment or count-up mode.

The above-described relationship between the ON-OFF operation of the detecting switch 11 and the operation modes of CPU 2006 may be reversed and such relationship may be determined depending upon a film back mounted on the camera.

Figure 27:
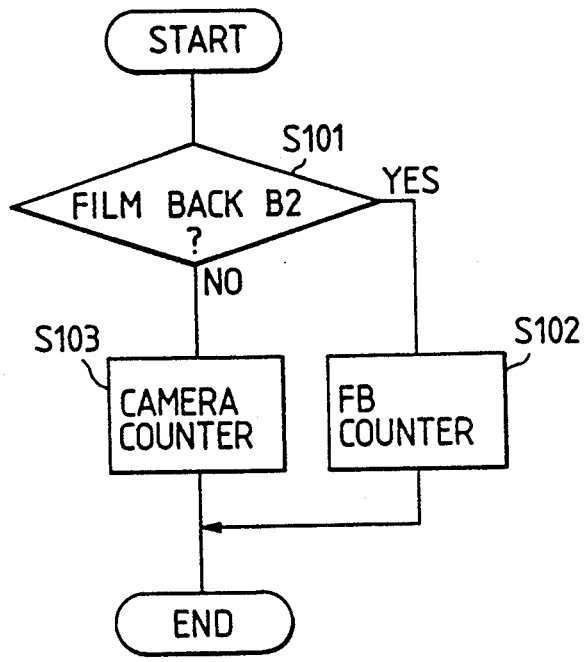

Referring next to FIG. 27 the mode of operation of the CPU 2005 incorporated in the camera C will be described hereinafter.

In the step S101 the camera C deters whether the long-length film back B2 is mounted thereof or not based upon ON-OFF operation the detecting switch 2011. When the result of the step S101 is "YES", the type signal of the film back mounted is transmitted through contacts 2010a and 2010b is transmitted and is detected. When the long-length film back B2 is mounted; that is, when the detecting switch 2011 is turned on, the counting information of the long-length film back B2 is read out and displayed by the display means 2001.

Figure 28:
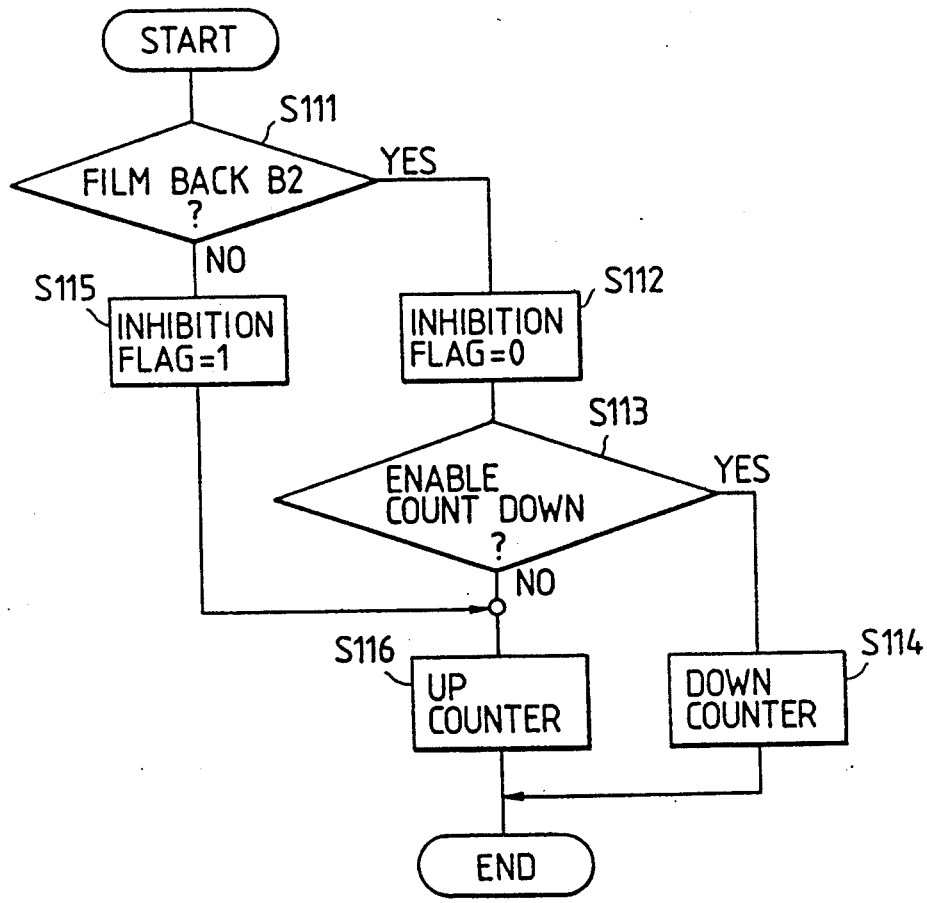

FIG. 28 is a flowchart illustrating the mode of operation of CPU 2006 incorporated in the type of a film back and whether or not the film back mounted is a long-length film back or not is detected by the detecting switch 2011.

When it is detected that the long-length film back B2 is detected, as shown in the step S112, the down or decrementing counting inhibition flag is become "0" and in the step S110, whether or not the down or decrement counting mode is established is detected. The down or decrement counting flag decides whether or not the switching to the down or decrement counting mode is permitted in response to the depression of the push button 2004c and 2004d. When the down or decrement inhibition flag is "0", it becomes possible to switch the down or decrement counting mode by depressing the push button 2004c and 2004d. In the step S114, the down counter 2009 is actuated and the down or decrement counting mode is displayed by turning on the down or decrement counting mark 2002a.

On the other hand, when the result of the step S111 is "NO"; that is, when no long-length film back is used, as shown in the step S115, the down or decrement counting inhibition flag is switched to "1". As a result, in the step S116, the up or increment counter is actuated and it becomes possible switch this mode to the down or decrement counting mode.

The down or decrement counting mode mark 2002a is not turned on so that the camera with the film back mounted thereon is detected by the user.

As described above, according to the third preferred embodiment of the present invention, the mounting of the long-length film back is detected and film counting information is displayed not only by the film back but also by the film back. Furthermore the long-length film back is switched between the between the up or increment counting mode and the down or decrement counting mode, which is displayed by ON-OFF operation of the mark 2002a. Therefore, a special operating unit for switching the film counting mode to the camera can be eliminated and the displays of the film count by the film back and the camera can be made concident with each other. Furthermore when no long-length film back is mounted, both the camera and the film back display their respective film counting information and the switching to the down or decrement counting mode is inhibited in the film back. Therefore there is no fear that the film counting display by the camera is different from the film counting display by the long-length film back so that the erroneous recognition of the mode set can be prevented.

What is claimed is:

1. A camera having a film counter and capable of mounting a film back incorporating therein a film counter for counting a number of exposed frames comprising;
    a film counter on the side of said camera for counting the number of frames exposed and outputting it as film count information or data;
    display means for said film count information or data;
    means for detecting whether or not said film back is mounted on said cameras;
    reception of means for receiving the film count information or data on the side of said film back; and
    display control means for causing said display means to display said film count information or data on the film back received by said reception means when the output representative of the mounting of said film back and further causing said display means to display the film count information obtained by said film counter on the side of said camera when the output representative of the film count information or data detected by said detection means is not available.

2. A camera as set forth in claim 1, wherein the counters incorporated in said film back includes an up counter for counting a number of exposed frames of a film and a down counter for counting a number of unexposed frames of said film.

* * * * *